US012720482B2

(12) United States Patent
Momani et al.

(10) Patent No.: US 12,720,482 B2
(45) Date of Patent: Aug. 25, 2026

(54) APPARATUS AND METHOD FOR PROVIDING, RECEIVING AND USING A TRANSMISSION CHARACTERISTICS INDICATION FOR POSITIONING MEASUREMENTS

(71) Applicant: Fraunhofer-Gesellschaft zur Foerderung der angewandten Forschung e.V., Munich (DE)

(72) Inventors: Mohammad Momani, Erlangen (DE); Mohammad Alawieh, Erlangen (DE); Birendra Ghimire, Erlangen (DE); Ernst Eberlein, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 211 days.

(21) Appl. No.: 18/505,501

(22) Filed: Nov. 9, 2023

(65) Prior Publication Data

US 2024/0224225 A1 Jul. 4, 2024

Related U.S. Application Data

(63) Continuation of application No. PCT/EP2022/062489, filed on May 9, 2022.

(30) Foreign Application Priority Data

May 9, 2021 (EP) .................................... 21172919

(51) Int. Cl.
*H04W 64/00* (2009.01)
*G01S 5/00* (2006.01)
(Continued)

(52) U.S. Cl.
CPC ......... *H04W 64/006* (2013.01); *G01S 5/0036* (2013.01); *G01S 5/0236* (2013.01);
(Continued)

(58) Field of Classification Search
CPC ... H04W 64/006; H04W 24/10; H04W 72/23; H04W 4/02; H04W 24/08; H04W 72/542;
(Continued)

(56) References Cited

U.S. PATENT DOCUMENTS

2020/0351813 A1* 11/2020 Manolakos ........... H04W 24/10
2022/0078656 A1* 3/2022 Venugopal ............. H04B 7/088
(Continued)

FOREIGN PATENT DOCUMENTS

KR 10-2020-0127529 A 11/2020
WO 2020206021 A1 10/2020
WO 2020222518 A1 11/2020

OTHER PUBLICATIONS

ETSI, "TS 38.331 v 16.1.0, 5G; NR; Radio Resource Control (RRC); Protocol specification", (3GPP TS 38.331 version 16.1.0 Release 16) (886 pp.), Jul. 2020, 668 pp. Uploaded in 2 parts.
(Continued)

*Primary Examiner* — Dady Chery
(74) *Attorney, Agent, or Firm* — Ashurst Perkins Coie US LLP; Michael A. Glenn

(57) ABSTRACT

A user equipment for transmitting and receiving data in a wireless communication system according to an embodiment is provided. The user equipment is configured to receive, from a first network entity of the wireless communication system, assistance data comprising information on a plurality of resources of a wireless communication system. Moreover, the user equipment is configured to receive configuration information from the first network entity or from a second network entity of the wireless communication
(Continued)

system; wherein the configuration information comprises information on one or more proper subsets of the plurality of resources, wherein each of the one or more proper subsets comprises at least one of the plurality of resources. Depending on the configuration information, the user equipment is configured to perform and/or to report one or more measurements on one or more of the plurality of resources.

19 Claims, 10 Drawing Sheets

(51) Int. Cl.
*G01S 5/02* (2010.01)
*H04L 5/00* (2006.01)
*H04W 24/10* (2009.01)
*H04W 72/23* (2023.01)

(52) U.S. Cl.
CPC .......... *H04L 5/0051* (2013.01); *H04W 24/10* (2013.01); *H04W 72/23* (2023.01)

(58) Field of Classification Search
CPC ..... H04W 4/029; H04W 92/18; G01S 5/0036; G01S 5/0236; G01S 5/10; G01S 5/0244; H04L 5/0051; H04L 5/0048; H04L 5/0007; H04L 5/001; H04L 5/0057; H04L 5/1469; H04L 5/0094; H04L 5/0053; H04B 7/0621; H04B 17/252; H04B 17/254; H04B 7/0617
See application file for complete search history.

(56) References Cited

U.S. PATENT DOCUMENTS

2022/0159415 A1* 5/2022 Khoryaev ............ H04W 64/00
2022/0279367 A1 9/2022 Hwang et al.

OTHER PUBLICATIONS

ETSI, "TS 137 355 V16.1.0 (Jul. 2020, LTE; 5G; LTE Positioning Protocol (LPP)", (3GPP TS37.355 version 16.1.0 Release 16), Jul. 2020, 294 pp.
ETSI, "TS 38.455 v16.0.0 5G; NG-RAN; NR Positioning Protocol A (NRPPa)", (3GPP TS38.455 version 16.0.0 Release 16), Sep. 2020, 61 pp.
3GPP TS38.331 V16.4.1, NR; Radio Resource Control (RRC) protocol specification, published on the 3GPP server on Mar. 30, 2021.
Huawei—Moderator, R3-206874, SOD on Use Cases for SI on Data Collection, 3GPP TSG RAN WG3 #110-E, published on the 3GPP server on Nov. 17, 2020.

* cited by examiner

APPARATUS AND METHOD FOR PROVIDING, RECEIVING AND USING A TRANSMISSION CHARACTERISTICS INDICATION FOR POSITIONING MEASUREMENTS

CROSS-REFERENCE TO RELATED APPLICATIONS

This application is a continuation of copending International Application No. PCT/EP2022/062489, filed May 9, 2022, which is incorporated herein by reference in its entirety, and additionally claims priority from European Application No. EP 21172919.9, filed May 9, 2021, which is also incorporated herein by reference in its entirety.

The present invention relates to the field of wireless communication systems or networks, more specifically to transmitting or receiving a beam direction configuration in such a network.

BACKGROUND OF THE INVENTION

FIG. 1 is a schematic representation of an example of a terrestrial wireless network 100 including, as is shown in FIG. 1(*a*), the core network and one or more radio access networks $RAN_1$, $RAN_2$, . . . $RAN_N$ (RAN=Radio Access Network). FIG. 1(*b*) is a schematic representation of an example of a radio access network $RAN_n$ that may include one or more base stations $gNB_1$ to $gNB_5$ (gNB=next generation Node B), each serving a specific area surrounding the base station schematically represented by respective cells $\mathbf{106}_1$ to $\mathbf{106}_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, (UE=User Equipment) also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base stations $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR (New Radio), with each other via respective backhaul links $\mathbf{116}_1$ to $\mathbf{116}_5$, which are schematically represented in FIG. 1(*b*) by the arrows pointing to "gNBs". A sidelink channel allows direct communication between UEs, also referred to as device-to-device, D2D (Device to Device), communication. The sidelink interface in 3GPP (3G Partnership Project) is named PC5 (Proximity-based Communication 5).

For data transmission a physical resource grid may be used. The physical resource grid may comprise a set of resource elements to which various physical channels and physical signals are mapped. For example, the physical channels may include the physical downlink, uplink and sidelink shared channels, PDSCH (Physical Downlink Shared CHannel), PUSCH (Physical Uplink Shared Channel), PSSCH (Physical Sidelink Shared Channel), carrying user specific data, also referred to as downlink, uplink and sidelink payload data, the physical broadcast channel, PBCH (Physical Broadcast Channel), carrying for example a master information block, MIB, and one or more of a system information block, SIB, one or more sidelink information blocks, SLIBs, if supported, the physical downlink, uplink and sidelink control channels, PDCCH (Physical Downlink Control Channel), PUCCH (Physical Uplink Control CHannel), PSSCH, carrying for example the downlink control information, DCI, the uplink control information, UCI, and the sidelink control information, SCI, and physical sidelink feedback channels, PSFCH (Physical sidelink feedback channel), carrying PC5 feedback responses. Note, the sidelink interface may support a 2-stage SCI (Speech Call Items). This refers to a first control region comprising some parts of the SCI, and, optionally, a second control region, which comprises a second part of control information.

For the uplink, the physical channels may further include the physical random-access channel, PRACH (Packet Random Access Channel) or RACH (Random Access Channel), used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols (OFDM=Orthogonal Frequency-Division Multiplexing) depending on the cyclic prefix, CP, length. A frame may also include of a smaller number of OFDM symbols, e.g. when utilizing a shortened transmission time interval, sTTI (slot or subslot transmission time interval), or a mini-slot/non-slot-based frame structure comprising just a few OFDM symbols.

The wireless communication system may be any single-tone or multicarrier system using frequency-division multiplexing, like orthogonal frequency-division multiplexing, OFDM, or orthogonal frequency-division multiple access, OFDMA (Orthogonal frequency-division multiple access), or any other IFFT-based signal (IFFT=Inverse Fast Fourier Transformation) with or without CP, e.g. DFT-s-OFDM (DFT=discrete Fourier transform). Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base stations $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

In a wireless communication network, like the one depicted in FIG. 1, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

FIG. 2 illustrates a wireless positioning communication system. In particular, FIG. 2 shows an example of a positioning wireless network architecture. As well as the wireless network or communication system depicted in FIG. 1, the wireless communication system illustrated in FIG. 2 may be any single-tone or multicarrier system using frequency-division multiplexing, like orthogonal frequency-division multiplexing, OFDM, or orthogonal frequency-division multiple access, OFDMA, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

As well as the wireless network or communication system depicted in FIG. 1, the wireless network or communication system depicted in FIG. 2 may be a heterogeneous network having distinct overlaid networks, e.g., a network of macro cells with each macro cell including a macro base station, like base stations BS1 to BS4, and a network of small cell base stations, not shown in FIG. 2, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 2, for example in accordance with the LTE-Advanced Pro standard or the 5G or NR, new radio, standard.

The Base station can wirelessly communicate and exchange messages with one or more UEs (104,108,109) and/or one or more reference devices (device at known position, 104). The Base stations can directly communicate and exchange information with other Base stations (106, 110), the other base station may be from the same technology, and/or same or different generation or even a different technology. The target UEs and/or reference devices may perform wireless signaling for the purpose of positioning or synchronization (112 to 116). The BS may include distributed units connected to the respective central unit or BS via the F1 interface (106) or over a non-standard interface. Two central BS(s) may also be connected via the XN/X2 interface(s) or over a non-standard interface.

In mobile communication networks, for example in a network like that described above with reference to FIG. 2, like an LTE or 5G/NR network, there may be UEs that communicate directly with each other over one or more sidelink, SL, channels, e.g., using the PC5/PC3 interface or WiFi direct (107). UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

The network entities(s) which may be involved in computing the position of a UE. To calculate the position reports may be exchanged using the interfaces between the UE (101,103) and the other network RAN entities or between components of the network (102, 105). The network entity may be part of the core network includes the location management function, LMF, and the Access and Mobility Management Function, AMF, which communicate using the Network Layer Signaling protocol, NLs. The communicating with the other entities and devices of the network may use control or a user plane interfaces.

In a wireless communication network, like the one depicted in FIG. 2, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may comprise information that does not form prior art that is already known to a person of ordinary skill in the art.

Starting from the above, there may be a need for improvements or enhancements for a wireless communication system or network and its components.

SUMMARY

A user equipment for transmitting and receiving data in a wireless communication system according to an embodiment is provided. The user equipment is configured to receive, from a first network entity of the wireless communication system, assistance data comprising information on a plurality of resources of the wireless communication system. Moreover, the user equipment is configured to receive configuration information from the first network entity or from a second network entity of the wireless communication system; wherein the configuration information comprises information on one or more proper subsets of the plurality of resources, wherein each of the one or more proper subsets comprises at least one of the plurality of resources. Depending on the configuration information, the user equipment is configured to perform and/or to report one or more measurements on one or more of the plurality of resources. The one or more proper subsets comprise one or more first subsets of the plurality of resources; wherein, after receiving the configuration information, the user equipment is configured to perform and/or to report the one or more measurements on one or more of the plurality of resources that are comprised by the one or more first subsets; and/or wherein the one or more proper subsets comprise one or more second subsets of the plurality of resources; wherein, after receiving the configuration information, the user equipment is configured to perform and/or to report the one or more measurements on one or more of the plurality of resources that are not comprised by the one or more second subsets.

Moreover, a user equipment for transmitting and receiving data in a wireless communication system is provided. The user equipment is configured to receive, from a first network entity of the wireless communication system, assistance data comprising information on a plurality of resources of the wireless communication system. Furthermore, the user equipment is configured to receive configuration information from the first network entity or from a second network entity of the wireless communication system; wherein the configuration information comprises information on one or more proper subsets of the plurality of resources, wherein each of the one or more proper subsets comprises at least one of the plurality of resources. Moreover, the user equipment is configured to request from the first network entity a resource configuration depending on a selection of the one or more proper subsets. The request is identified by the configuration information comprising a selection indication depending on the one or more selected subsets.

Furthermore, a user equipment for transmitting and receiving data in a wireless communication system is provided. The user equipment is configured to receive, from a first network entity of the wireless communication system, assistance data comprising information on a plurality of resources of the wireless communication system. Moreover, the user equipment is configured to receive configuration information from the first network entity or from a second network entity of the wireless communication system; wherein the configuration information comprises information on one or more proper subsets of the plurality of resources, wherein each of the one or more proper subsets comprises at least one of the plurality of resources. Furthermore, the user equipment is configured to determine at least one of the one or more proper subsets depending on a (e.g., selection) criterion. The criterion is indicated by the configuration information and/or is selected depending on the one or more measurements.

Moreover, a user equipment for transmitting and receiving data in a wireless communication system is provided. The user equipment is configured to request from the first network entity information on assistance data and/or is configured to request an update on previously configured information on the assistance data. Furthermore, the user equipment is configured to receive from the first network entity or from the second network entity a configuration message comprising configuration information, wherein the configuration information comprises information on one or more downlink reference signals of a group of downlink reference signals. Moreover, the user equipment is configured to receiving from a base station the one or more downlink reference signals. Moreover, the user equipment is configured to determine, depending on the configuration, a proper subset of the group of downlink reference signals. Furthermore, the user equipment is configured to perform and/or to report one or more measurements on the proper subset of the group of downlink reference signals; or the user equipment is configured to refrain from using a part of the proper subset of the group of downlink reference signals.

Furthermore, a user equipment for transmitting and receiving data in a wireless communication system is provided. The user equipment is configured to receive, from a first network entity of the wireless communication system, assistance data comprising information on a plurality of resources of the wireless communication system. The user equipment is configured to receive configuration information from the first network entity or from a second network entity of the wireless communication system. The configuration information comprises information on one or more proper subsets of the plurality of resources, wherein each of the one or more proper subsets comprises at least one of the plurality of resources. Depending on the configuration information, the user equipment is configured to perform one or more measurements on one or more of the plurality of resources. The one or more proper subsets comprise one or more first subsets of the plurality of resources; wherein, after receiving the configuration information, the user equipment is configured to not perform any measurement on any of the plurality of resources that are not comprised by the one or more first subsets, and is configured to perform the one or more measurements on one or more of the plurality of resources that are comprised by the one or more first subsets. And/or, the one or more proper subsets comprise one or more second subsets of the plurality of resources; wherein, after receiving the configuration information, the user equipment is configured to not perform any measurement on any of the plurality of resources that are comprised by the one or more second subsets; and is configured to perform the one or more measurements on one or more of the plurality of resources that are not comprised by the one or more second subsets.

Moreover, a network entity for transmitting and receiving data in a wireless communication system is provided. A user equipment is configured to receive, from the network entity or from another network entity, assistance data comprising information on a plurality of resources of the wireless communication system. The network entity is configured to transmit configuration information to the user equipment; wherein the configuration information comprises information on one or more proper subsets of the plurality of resources, wherein each of the one or more proper subsets comprises at least one of the plurality of resources.

Furthermore, a method for transmitting and receiving data in a wireless communication system, wherein a user equipment receives, from the network entity or from another network entity, assistance data comprising information on a plurality of resources of the wireless communication system. The method comprises transmitting configuration information to the user equipment; wherein the configuration information comprises information on one or more proper subsets of the plurality of resources, wherein each of the one or more proper subsets comprises at least one of the plurality of resources.

Moreover, a method for transmitting and receiving data in a wireless communication system is provided. The method comprises:

Receiving, from a first network entity of the wireless communication system, assistance data comprising information on a plurality of resources of the wireless communication system.

Receiving configuration information from the first network entity or from a second network entity of the wireless communication system; wherein the configuration information comprises information on one or more proper subsets of the plurality of resources, wherein each of the one or more proper subsets comprises at least one of the plurality of resources. And:

Performing one or more measurements on one or more of the plurality of resources depending on the configuration information.

The one or more proper subsets comprise one or more first subsets of the plurality of resources; wherein, after receiving the configuration information, the method comprises performing and/or reporting the one or more measurements on one or more of the plurality of resources that are comprised by the one or more first subsets. And/or, the one or more proper subsets comprise one or more second subsets of the plurality of resources; wherein, after receiving the configuration information, the method comprises performing and/or reporting the one or more measurements on one or more of the plurality of resources that are not comprised by the one or more second subsets.

Furthermore, a method for transmitting and receiving data in a wireless communication system is provided. A user equipment receives, from the network entity or from another network entity, assistance data comprising information on a plurality of resources of the wireless communication system. The method comprises:

Transmitting configuration information to the user equipment; wherein the configuration information comprises information on one or more proper subsets of the plurality of resources, wherein each of the one or more proper subsets comprises at least one of the plurality of resources.

Moreover, a method for transmitting and receiving data in a wireless communication system, wherein the method comprises:

Receiving, by a user equipment of the wireless communication system is configured to, from a first network entity of the wireless communication system, assistance data comprising information on a plurality of resources of the wireless communication system.

Receiving, by the user equipment, configuration information from the first network entity or from a second network entity of the wireless communication system; wherein the configuration information comprises information on one or more proper subsets of the plurality of resources, wherein each of the one or more proper subsets comprises at least one of the plurality of resources. And:

Requesting, by the user equipment, from the first network entity a resource configuration depending on a selection of the one or more proper subsets;

The request is identified by the configuration information comprising a selection indication depending on the one or more selected subsets.

Furthermore, a method for transmitting and receiving data in a wireless communication system. The method comprises:

Receiving, by a user equipment of the wireless communication system, from a first network entity of the wireless communication system, assistance data comprising information on a plurality of resources of the wireless communication system.

Receiving, by the user equipment, configuration information from the first network entity or from a second network entity of the wireless communication system; wherein the configuration information comprises information on one or more proper subsets of the plurality of resources, wherein each of the one or more proper subsets comprises at least one of the plurality of resources. And:

Determining, by the user equipment, at least one of the one or more proper subsets depending on a criterion.

The criterion is indicated by the configuration information and/or is selected depending on the one or more measurements.

Moreover, a method for transmitting and receiving data in a wireless communication system is provided. The method comprises:

Requesting, by a user equipment of the wireless communication system, from the first network entity information on assistance data; and/or requesting, by the user equipment, an update on previously configured information on the assistance data.

Receiving, by the user equipment, the user equipment, from the first network entity or from the second network entity a configuration message comprising configuration information, wherein the configuration information comprises information on one or more downlink reference signals of a group of downlink reference signals.

Receiving, by the user equipment, from a base station the one or more downlink reference signals.

Determining, by the user equipment, depending on the configuration, a proper subset of the group of downlink reference signals. And:

Performing and/or reporting, by the user equipment, one or more measurements on the proper subset of the group of downlink reference signals; or refraining from using a part of the proper subset of the group of downlink reference signals by the user equipment.

Furthermore, a method for transmitting and receiving data in a wireless communication system is provided. The method comprises:

Receiving, from a first network entity of the wireless communication system, assistance data comprising information on a plurality of resources of the wireless communication system;

Receiving configuration information from the first network entity or from a second network entity of the wireless communication system; wherein the configuration information comprises information on one or more proper subsets of the plurality of resources, wherein each of the one or more proper subsets comprises at least one of the plurality of resources. And:

Performing one or more measurements on one or more of the plurality of resources depending on the configuration information;

The one or more proper subsets comprise one or more first subsets of the plurality of resources; wherein, after receiving the configuration information, the method comprises not performing any measurement on any of the plurality of resources that are not comprised by the one or more first subsets, and comprises performing the one or more measurements on one or more of the plurality of resources that are comprised by the one or more first subsets. And/or, the one or more proper subsets comprise one or more second subsets of the plurality of resources; wherein, after receiving the configuration information, the method comprises not performing any measurement on any of the plurality of resources that are comprised by the one or more second subsets; and comprises performing the one or more measurements on one or more of the plurality of resources that are not comprised by the one or more second subsets.

Furthermore, a non-transitory computer program product comprising a computer readable medium storing instructions which, when executed on a computer, perform one of the above described methods is provided.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
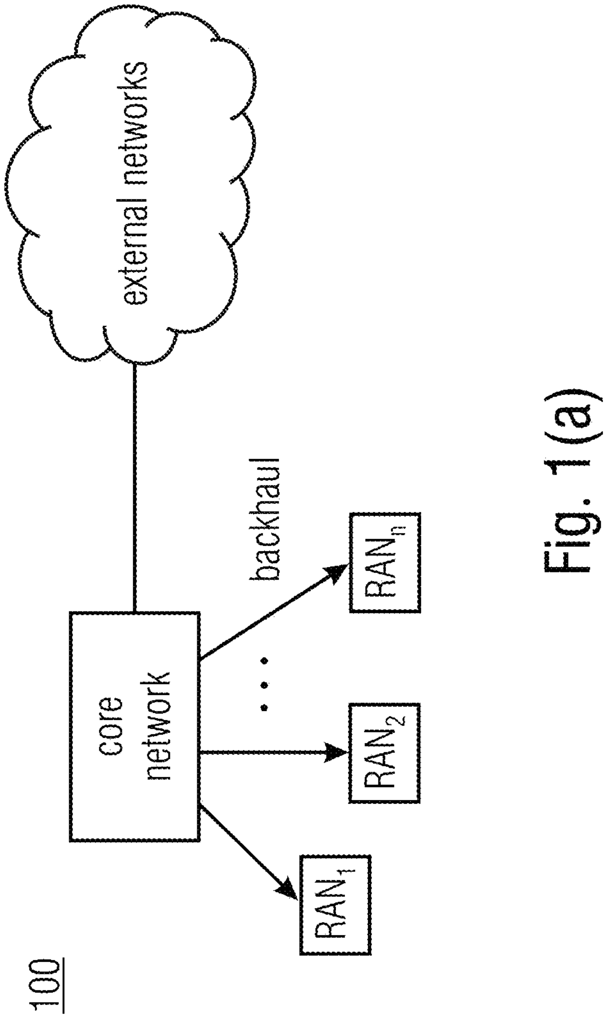
FIG. 1*a-b* illustrates a schematic representation of an example of a terrestrial wireless network.
Figure 1B:
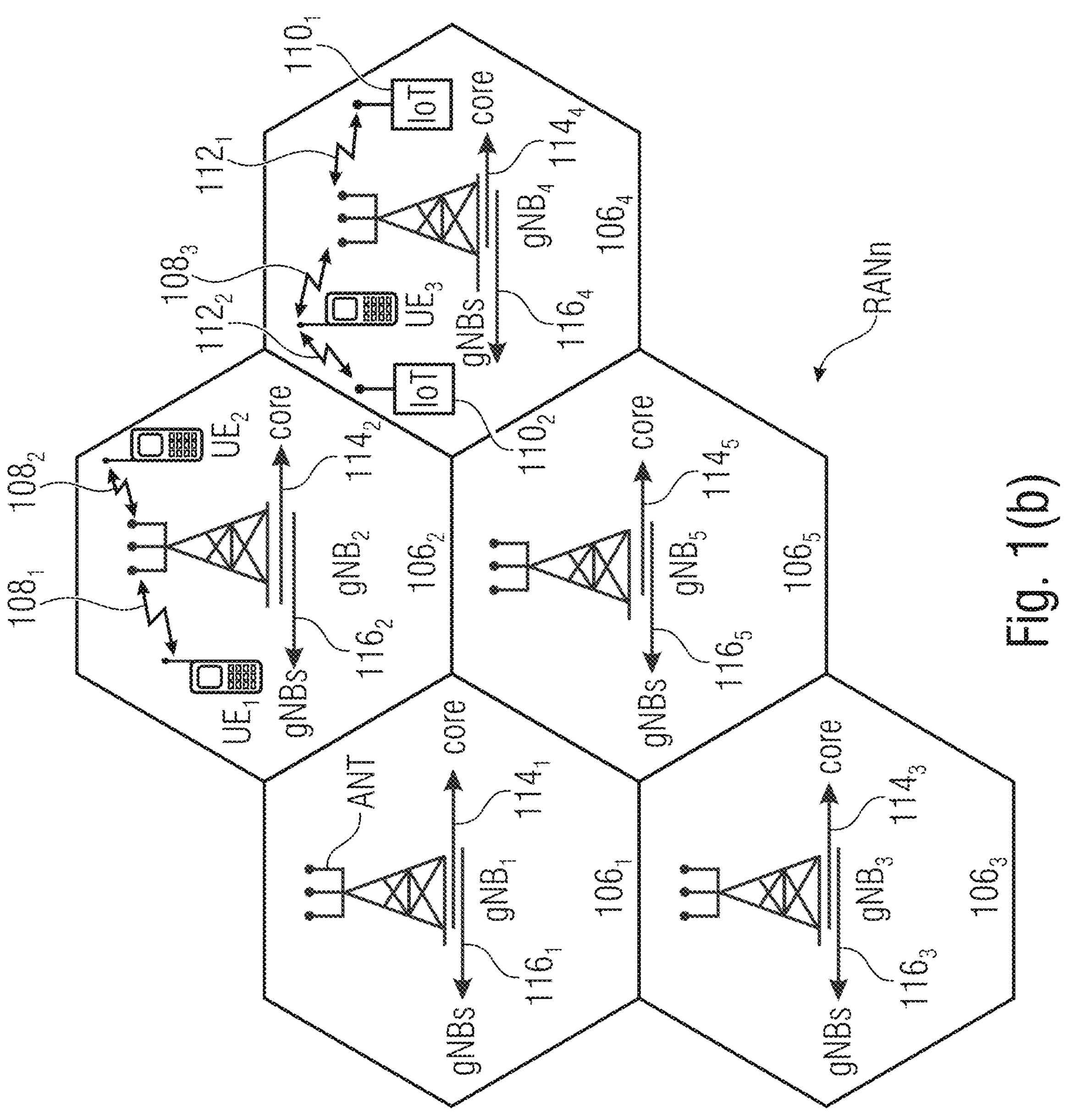

Embodiments of the present invention are now described in more detail with reference to the accompanying drawings, in which the same or similar elements have the same reference signs assigned.

A user equipment for transmitting and receiving data in a wireless communication system according to an embodiment is provided.

The user equipment is configured to receive, from a first network entity of the wireless communication system, assistance data comprising information on a plurality of resources of the wireless communication system.

Moreover, the user equipment is configured to receive configuration information from the first network entity or from a second network entity of the wireless communication system; wherein the configuration information comprises information on one or more proper subsets of the plurality of resources, wherein each of the one or more proper subsets comprises at least one of the plurality of resources.

Depending on the configuration information, the user equipment is configured to perform and/or to report one or more measurements on one or more of the plurality of resources.

The one or more proper subsets comprise one or more first subsets of the plurality of resources; wherein, after receiving the configuration information, the user equipment is configured to perform and/or to report the one or more measurements on one or more of the plurality of resources that are comprised by the one or more first subsets.

And/or, the one or more proper subsets comprise one or more second subsets of the plurality of resources; wherein, after receiving the configuration information, the user equipment is configured to perform and/or to report the one or more measurements on one or more of the plurality of resources that are not comprised by the one or more second subsets.

In an embodiment, the user equipment may, for example, be provided with assistance data, which may, for example, comprise a grouping of RS resources which may, e.g., assist the user equipment in conducting one or more measurements, e g., with respect to a targeted/right subset, and/or in reporting one or more measurements, e g., with respect to a targeted/right subset.

For example, the second network entity may, e.g., be a gNB or a user equipment.

For example, the user equipment may, e.g., be provided with instructions according to a subset configuration to perform and/or to report measurements.

According to an embodiment, the user equipment may, for example, report downlink measurements (for example downlink PRS-RSRPP measurements and/or downlink PRS-RSRP measurements) only for a subset of PRS resources.

For example, the user equipment may, e.g., be provided with instructions according to a subset configuration (e.g., with respect to the second subset) which may, e.g., be independent from the first subset.

According to an embodiment, the plurality of resources comprise a plurality of downlink resources of the wireless communication system. The assistance data may, e.g., comprise information on the plurality of downlink resources of the wireless communication system. The one or more proper subsets comprise at least one of the plurality of downlink resources.

In an embodiment, the plurality of downlink resources comprise a plurality of downlink reference signal resources of the wireless communication system; wherein the assistance data may, e.g., comprise information on the plurality of downlink reference signal resources of the wireless communication system; wherein the one or more proper subsets comprise at least one of the plurality of downlink reference signal resources.

According to an embodiment, the plurality of downlink resources comprise a plurality of physical downlink control channel resources of the wireless communication system, wherein the assistance data may, e.g., comprise information on the plurality of physical downlink control channel resources of the wireless communication system, wherein the one or more proper subsets comprise at least one of the plurality of physical downlink control channel resources. And/or, the plurality of downlink resources comprise a plurality of physical downlink shared channel resources of the wireless communication system, wherein the assistance data may, e.g., comprise information on the plurality of physical downlink shared channel resources of the wireless communication system, wherein the one or more proper subsets comprise at least one of the plurality of physical downlink shared channel resources. And/or, the plurality of downlink resources comprise a plurality of physical broadcast channel resources of the wireless communication system, wherein the assistance data may, e.g., comprise information on the plurality of physical broadcast channel resources of the wireless communication system, wherein the one or more proper subsets comprise at least one of the plurality of physical broadcast channel resources.

In an embodiment, the user equipment may, e.g., be configured to perform and/or to report the one or more measurements on all resources of the plurality of resources that are comprised by the one or more first subsets. And/or, the user equipment may, e.g., be configured to perform and/or to report the one or more measurements on all resources of the plurality of resources that are not comprised by the one or more second subsets.

According to an embodiment, the user equipment may, e.g., be configured to perform and/or to report the one or more measurements on one or more but not all of the plurality of resources that are comprised by the one or more first subsets. And/or, the user equipment may, e.g., be configured to perform and/or to report the one or more measurements on one or more but not all of the plurality of resources that are not comprised by the one or more second subsets.

In an embodiment, at least one of the one or more proper subsets may, e.g., comprise at least two of the plurality of resources.

According to an embodiment, the user equipment may, e.g., be configured to receive an assistance message comprising the assistance data from the first network entity. The user equipment may, e.g., be configured to receive a configuration message comprising the configuration information, which may, e.g., comprise the information on the one or more proper subsets, from the first network entity or from the second network entity.

In an embodiment, the assistance message may, e.g., comprise assistance data specific for the user equipment.

According to an embodiment, the user equipment may, e.g., be configured to receive a broadcast transmission comprising the assistance message.

In an embodiment, the user equipment may, e.g., be configured to perform and/or to report the one or more measurements to determine power delay profile information, and/or one or more channel impulse response reports, and/or one or more phase measurements on a first arrival path.

According to an embodiment, the user equipment may, e.g., be configured to determine a positioning method depending on a resource of the at least one proper subset to perform and/or to report the one or more measurements on the one or more of the plurality of resources.

In an embodiment, the assistance data may, e.g., comprise base station information comprising one or more base station identifier and one or more downlink reference signal resource identifier.

According to an embodiment, the one or more proper subsets comprise a plurality of downlink reference signal resources of one or more resources sets of a single base station and/or of a single frequency layer. The user equipment may, e.g., be configured to perform and/or to report measurements on the plurality of downlink reference signal resources of the one or more resources sets of the base station and/or of the single frequency layer.

For example, the one or more proper subsets may, e.g., comprise a DL-AOD with respect to the single base station.

In an embodiment, the one or more proper subsets comprise a plurality of downlink reference signal resources of one or more resources sets of two or more base stations and/or of two or more frequency layers. The user equipment may, e.g., be configured to perform and/or to report measurements on the plurality of downlink reference signal resources of the one or more resources sets of the two or more base stations and/or of the two or more frequency layers.

According to an embodiment, the assistance data may, e.g., comprise an indication on the single base station and/or on the single frequency layer. Or, the assistance data may, e.g., comprise an indication on the two or more base stations and/or on the two or more frequency layers.

In an embodiment, the configuration information defines the one or more proper subsets independent of an order of the plurality of resources in the assistance data.

According to an embodiment, the assistance data may, e.g., comprise information that may, e.g., be hierarchically organized in two or more layers. Each of the two or more layers may, e.g., comprise one or more information nodes. For at least one of the two or more layers, each of the one or more information nodes of said layer provides information on one of the plurality of resources.

In an embodiment, the one or more information nodes of a first layer of the two or more layers comprise information on one or more frequency layers. The one or more information nodes of a second layer of the two or more layers, being hierarchically subordinated under the first layer, comprise information on one or more base stations. The one or more information nodes of a third layer of the two or more layers, being hierarchically subordinated under the second layer, comprise information on one or more resource sets. The one or more information nodes of a fourth layer of the two or more layers, being hierarchically subordinated under the third layer, comprise information on the plurality of resources.

According to an embodiment, the configuration information may, e.g., comprise information on the one or more proper subsets, such that for each proper subset of the one or more proper subsets, the information defines which of the information nodes of a single, same layer of the two or more layers belong to the proper subset, without defining which elements of other layers of the two or more layers belong to the proper subset.

In an embodiment, the configuration information may, e.g., comprise information on the one or more proper subsets, such that for each proper subset of one or more of the one or more proper subsets, the information defines which of the information nodes of at least two layers of the two or more layers belong to the proper subset.

According to an embodiment, the configuration information defines the one or more proper subsets independent of an order of the information provided over a single layer of the two or more layers of the assistance data.

In an embodiment, the configuration information may, e.g., comprise non-sequential information. The user equipment may, e.g., be configured to use the assistance data, being hierarchically organized in the two or more layers, and the non-sequential information to determine the one or more proper subsets.

According to an embodiment, the plurality of resources are comprised by one of the one or more layers of the assistance data. The assistance data defines an order for the plurality of resources in said one of the two or more layers of the assistance data. The user equipment may, e.g., be configured to determine a priority of two or more resources of the one or more proper subsets depending on the order. The user equipment may, e.g., be configured to perform and/or to report two or more measurements on the two or more resources depending on the priority of the two or more resources of the one or more proper subsets.

For example, an IE NR-DL-PRS-ResourceSubset may, e.g., be employed by the location server, for example, to provide a subset of DL-PRS Resources across DL-PRS Resource Sets, which may, for example, be associated with a particular DL-PRS Resource of a TRP, for the purpose of prioritization, for example, of DL-AoD reporting.

In an embodiment, the user equipment may, e.g., be configured to request from the first network entity a resource configuration depending on a selection of the one or more proper subsets. The request may, e.g., be identified by the configuration information comprising a selection indication depending on the one or more selected subsets.

For example, an LMF may, e.g., indicate one or more predefined configurations, and the user equipment may, e.g., request them via LPP RequestAssistanceData.

LPP signaling may, for example, be employed to explicitly request DL-PRS parameters.

According to an embodiment, the user equipment may, e.g., be configured to report at least one measurement and/or at least one indication depending on the provided assistance data comprising information on a plurality of resources to the first network entity. The user equipment may, e.g., be configured to receive the configuration information from the first network entity or from the second network entity of the wireless communication system; wherein the configuration information may, e.g., comprise the information on the one or more proper subsets of the plurality of resources, wherein each of the one or more proper subsets may, e.g., comprise at least one of the plurality of resources. The information on the one or more proper subsets of the plurality of resources may, e.g., depend on the report of the user equipment.

In an embodiment, the configuration information may, e.g., comprise at least one identifier indicating at least one of the plurality of resources, and/or one or more resource sets, and/or one or more one or more base stations, and/or one or more frequency layers of the assistance data. The user equipment may, e.g., be configured to determine the one or more proper subsets depending on the one or more identifiers.

According to an embodiment, the user equipment may, e.g., be configured to determine the one or more proper subsets depending on a (e.g., selection) criterion. The criterion may, e.g., be indicated by the configuration information and/or may, e.g., be selected depending on the one or more measurements.

For example, pre-configured DL-PRS assistance data may, e.g., be associated with a validity area, for example, in LPP.

In an embodiment, such assistance data may, e.g., be employed for RRC broadcast.

In an embodiment, the criterion defines that the user equipment shall select the one or more proper subsets depending on one or more reference signal receive power measurements and/or one or more time of arrival measurements and/or one or more signal qualities of one or more of the plurality of resources. The user equipment may, e.g., be configured to determine the one or more proper subsets depending on the one or more reference signal receive power measurements and/or the one or more time of arrival measurements and/or the one or more signal qualities of the one or more of the plurality of resources.

According to an embodiment, the user equipment may, e.g., be configured to transmit information on the one or more measurements to the first network node or the second network node or to another third network node for determining a position of the user equipment by the first network node or by the second network node or by the third network node.

In an embodiment, the user equipment may, e.g., be configured to determine the position of the user equipment using the one or more measurements.

According to an embodiment, the one or more measurements comprise a measurement of a reference signal receive power for a downlink angle of departure, and/or a measurement of a reference signal time difference for a downlink time difference of arrival and/or a user equipment receive-transmit round trip time.

In an embodiment, the user equipment may, e.g., be configured to determine a channel state information depending on the one or more measurements. Moreover, the user equipment may, e.g., be configured to transmit the channel state information to the first network node or to the second network node.

According to an embodiment, the first network entity may, e.g., implement a location management function or may, e.g., be a location server.

In an embodiment, the user equipment may, e.g., be configured to receive the configuration information from the first network entity.

According to an embodiment, the user equipment may, e.g., be configured to receive the assistance data and the configuration information from the first network entity in a single message.

In an embodiment, the user equipment may, e.g., be configured to receive the assistance data from the first network entity in a first message and the configuration information from the first network entity in a different second message.

According to an embodiment, the user equipment may, e.g., be configured to receive the assistance data and the configuration information via an LTE positioning protocol interface.

In an embodiment, the user equipment may, e.g., be configured to receive the configuration information from the second network entity, wherein the second network entity may, e.g., be another user equipment.

According to an embodiment, the user equipment may, e.g., be configured to receive the configuration information from the other user equipment via a sidelink.

In an embodiment, the user equipment may, e.g., be configured to receive the configuration information from the other user equipment via the sidelink using a PC5 interface.

According to an embodiment, the user equipment may, e.g., be configured to directly receive the configuration information from the other user equipment.

In an embodiment, the user equipment may, e.g., be configured to receive the configuration information from the other user equipment via another network entity.

According to an embodiment, the first network entity may, e.g., implement a first location management function or may, e.g., be a first location server or may, e.g., be a first base station or may, e.g., be another user equipment. The second network entity may, e.g., implement a second location management function or may, e.g., be a second location server or may, e.g., be a second base station or may, e.g., be another user equipment.

In an embodiment, the user equipment may, e.g., be configured to receive the configuration information from the second network entity, wherein the second network entity may, e.g., be a base station.

According to an embodiment, the user equipment may, e.g., be configured to request an update of the configuration information from the second network node or from another network node being different from the second network node.

In an embodiment, the user equipment may, e.g., be configured to determine information on a movement of the user equipment. The user equipment may, e.g., be configured to request the update of the configuration information depending on the information on the movement of the user equipment.

According to an embodiment, the configuration information may, e.g., depend on one or more measurements of one or more downlink reference signal resources of another user equipment.

In an embodiment, the user equipment may, e.g., be configured to receive the information on the one or more measurements of the one or more downlink reference signal resources of the other user equipment via the first network node and/or to the second network node.

According to an embodiment, the configuration information may, e.g., comprise information on two or more proper subsets of the plurality of resources. A first one of the two or more subsets may, e.g., be associated with a first one of two or more positioning methods. A second one of the two or more subsets may, e.g., be associated with a different, second one of two or more positioning methods.

In an embodiment, the two or more positioning methods comprise at least two positioning methods of the following positioning methods:

- a positioning method depending on a time difference of arrival,
- a positioning method depending on an angle of departure,
- a positioning method depending on an angle of arrival,
- a positioning method depending on a round trip time.

According to an embodiment, the user equipment may, e.g., be configured to select a positioning method. The user equipment may, e.g., be configured to select a subset out of the two or more subsets and/or a downlink reference signal, being associated with one of the two or more subsets, depending on the positioning method.

In an embodiment, each of the plurality of resources may, e.g., be associated with one of a plurality of beams. The configuration information may, e.g., comprise the information on the one or more proper subsets, wherein the one or more proper subsets comprise one or more of the plurality of resources, which may, e.g., be associated with one or more first beams of the plurality of beams, and does not comprise one or more other resources of the plurality of resources, which may, e.g., be associated with one or more second beams of the plurality of beams. The user equipment may, e.g., be configured to perform and/or to report the one or more measurements for at least one of the one or more first beams.

According to an embodiment, after receiving the configuration information, the user equipment may, e.g., be configured to not perform any measurement for any one of the one or more second beams.

In an embodiment, the configuration information may, e.g., depend on a beam direction and an expected coverage of one or more of the plurality of beams.

According to an embodiment, the configuration information may, e.g., depend whether or not a line-of-sight condition may, e.g., be valid for one or more of the plurality of beams.

In an embodiment, the configuration information may, e.g., depend on an azimuth angle and/or an elevation angle and/or an antenna gain per azimuth and/or per elevation of one or more of the plurality of beams.

According to an embodiment, the user equipment may, e.g., be configured to determine whether or not a line-of-sight condition may, e.g., be valid for one or more of the plurality of beams depending on the configuration message.

In an embodiment, the user equipment may, e.g., be configured to perform and/or to report two or more reference signal time difference measurements or two or more receive-transmit round trip time measurements depending on the configuration message, and may, e.g., be configured to transmit information on the two or more reference signal time difference measurements or on the two or more receive-transmit round trip time measurements to the first network entity or the second network entity for determining a position of the user equipment.

According to an embodiment, the user equipment may, e.g., be configured to perform and/or to report two or more reference signal time difference measurements or two or more receive-transmit round trip time measurements depending on the configuration message, and may, e.g., be configured to determine a position of the user equipment depending on the two or more reference signal time difference measurements or depending on the or two or more receive-transmit round trip time measurements.

In an embodiment, the configuration information may, e.g., comprise the information on the one or more proper subsets, wherein each of the one or more proper subsets may, e.g., comprise two or more downlink reference signal resources from a single base station.

According to an embodiment, the configuration information may, e.g., comprise the information on the one or more proper subsets, wherein each of the one or more proper subsets may, e.g., comprise one or more downlink reference signal resources of a first base station and one or more downlink reference signal resources of a different, second base station.

In an embodiment, the configuration information may, e.g., comprise the information on the one or more proper subsets, wherein the one or more proper subsets depend on a predicted estimation of a future position of the user equipment which may, e.g., depend on motion information for the user equipment.

According to an embodiment, the motion information for the user equipment may, e.g., comprise a velocity, and/or an acceleration and/or a displacement of the user equipment.

In an embodiment, the user equipment may, e.g., be configured to perform and/or to report the one or more measurements on the one or more of the plurality of resources for determining a position of the user equipment without taking the first line-of-sight information into account and/or without taking the maximum reference signal received power information into account. Or, the user equipment may, e.g., be configured to perform and/or to report the one or more measurements on the one or more of the plurality of resources for transmitting the information on the one or more measurements to the first network entity or to the second network entity to enable the first network entity or the second network entity to determine the position of the user equipment without taking the first line-of-sight information into account and/or without taking the maximum reference signal received power information into account.

According to an embodiment, for determining a position of the user equipment, the user equipment may, e.g., be configured to perform and/or to report one or more additional measurements, wherein the one or more additional measurements comprise a measurement of a time of arrival and/or a downlink angle of departure, and/or a downlink angle of arrival for one or more reflecting clusters.

In an embodiment, the configuration information may, e.g., comprise a proper subset of a plurality of downlink reference signal resources or resource sets. The user equipment may, e.g., be configured to not report measurements or to not apply any downlink reference signal resource of the subset of downlink reference signal resources or resource sets for positioning estimation.

According to an embodiment, the user equipment may, e.g., be configured to request from the first network entity information on the assistance data and/or may, e.g., be configured to request an update on previously configured information on the assistance data. The user equipment may, e.g., be configured to receive from the first network entity or from the second network entity a configuration message comprising the configuration information, wherein the configuration information may, e.g., comprise information on one or more downlink reference signals of a group of downlink reference signals. Moreover, the user equipment may, e.g., be configured to receiving from a base station the one or more downlink reference signals. The user equipment may, e.g., be configured to determine, depending on the configuration, a proper subset of the group of downlink reference signals to perform and/or to report one or more measurements on the proper subset of the group of downlink reference signals or to refrain from using a part of the proper subset of the group of downlink reference signals.

For example, the user equipment may, e.g., send a request for assistance data after receiving DL-PRS parameters.

In an embodiment, the user equipment may, e.g., be configured to determine whether or not the a downlink reference signal may, e.g., be still valid. When the user equipment has determined, that the downlink reference signal may, e.g., be no longer valid, the user equipment may, e.g., be configured to identify a new valid downlink assistance data subset from the assistance data and may, e.g., be configured to apply the information on the new valid downlink assistance data subset to obtain a new valid downlink assistance data subset.

According to an embodiment, the user equipment may, e.g., be configured to determine whether or not the a downlink reference signal may, e.g., be still valid. When the user equipment has determined, that the downlink reference signal may, e.g., be no longer valid, the user equipment may, e.g., be configured to request new assistance data from the first network entity or from the second network entity.

In an embodiment, the user equipment may, e.g., be configured to determine whether or not the a downlink reference signal may, e.g., be still valid, when the user equipment may, e.g., be moving.

According to an embodiment, the configuration information indicates, for at least one of the plurality of resources, association data, wherein the association data may, e.g., comprise for the one or more proper subsets an indication of one or more geographical areas, within which the one or more proper subsets are expected to be measured.

In an embodiment, the indication of the one or more geographical areas may, e.g., comprise one or more of the following:

- a RAN notification area and/or a Tracking area,
- a system information area,
- a positioning system information area,
- a cell,
- a portion of a cell, or a portion of the RAN notification area or a portion of a the system information area or a portion of the positioning system information area, for example, denoted by an area identifier.

According to an embodiment, the user equipment may, e.g., be configured to transmit capability information to the first network entity and/or to the second network entity, and/or to another network entity, wherein the capability information may, e.g., comprise information on

- a maximum number of frequency layers, and/or
- a maximum number of downlink reference signal resource set per base station per frequency layer, and/or
- a maximum number of resources per downlink reference signal resource set, and/or
- a maximum number of downlink position reference signals, and/or
- a maximum number of base stations for all frequency layers, and/or
- a maximum number of resources per frequency layer.

In an embodiment, the user equipment may, e.g., be configured to receive an instruction from the first network entity to provide information on a maximum number of capabilities, and may, e.g., be configured to transmit the information to the first network entity. The user equipment may, e.g., be configured to receive the assistance data comprising information on more resources than the maximum number. Moreover, the user equipment may, e.g., be configured to select a number of up to the maximum number out of the resources in the assistance data.

According to an embodiment, the user equipment may, e.g., be configured to not perform any measurement on any of the plurality of resources that are not comprised by the one or more first subsets. Moreover, the user equipment may, e.g., be configured to not perform any measurement on any of the plurality of resources that are comprised by the one or more second subsets.

In an embodiment, depending on a configuration message comprising the configuration information, the user equipment may, e.g., be configured to measure and to report information to the first network entity on measurement qualities of downlink reference signal resources. The user equipment may, e.g., be configured to receive from the first network entity an assistance message comprising the assistance data which may, e.g., comprise an updated group of downlink reference signal resources, associated with the downlink reference signal resources, measured by the user equipment depending on the measurement qualities. Moreover, the user equipment may, e.g., be configured to receive from the first network entity or from the second network entity another configuration message comprising a proper subset of the updated group of downlink reference signal resources. Furthermore, the user equipment may, e.g., be configured to receive one or more downlink reference signals from a base station. Depending on the other configuration message, the user equipment may, e.g., be configured to measure and to report information to the first network entity on measurement qualities of the updated group of downlink reference signal resources.

According to an embodiment, depending on the configuration information, the user equipment may, e.g., be configured to report the one or more measurements on the one or more of the plurality of resources to an entity of the wireless communication network. The one or more proper subsets comprise said one or more first subsets of the plurality of resources; wherein, after receiving the configuration information, the user equipment may, e.g., be configured to report the one or more measurements on said one or more of the plurality of resources that are comprised by the one or more first subsets to said entity of the wireless communication network; and/or wherein said one or more proper subsets comprise said one or more second subsets of the plurality of resources; wherein, after receiving the configuration information, the user equipment may, e.g., be configured to report the one or more measurements on said one or more of the plurality of resources that are not comprised by the one or more second subsets to said entity of the wireless communication network.

In an embodiment, the user equipment may, e.g., be configured to receive information on a transmission characteristics associated with one or more downlink reference signal resources or one or more downlink reference signal resource sets.

According to an embodiment, the transmission characteristics may, e.g., comprise information on a downlink reference signal transmit direction from a single base station.

In an embodiment, the transmission characteristics may, e.g., comprise information on plurality of downlink reference signal transmit directions from a plurality of base stations.

Moreover, according to an embodiment, a user equipment for transmitting and receiving data in a wireless communication system is provided.

The user equipment is configured to receive, from a first network entity of the wireless communication system, assistance data comprising information on a plurality of resources of the wireless communication system.

Furthermore, the user equipment is configured to receive configuration information from the first network entity or from a second network entity of the wireless communication system; wherein the configuration information comprises information on one or more proper subsets of the plurality of resources.

Each of the one or more proper subsets comprises at least one of the plurality of resources.

Moreover, the user equipment is configured to request from the first network entity a resource configuration depending on a selection of the one or more proper subsets.

The request is identified by the configuration information comprising a selection indication depending on the one or more selected subsets.

For example, an LMF may, e.g., indicate one or more predefined configurations, and the user equipment may, e.g., request them via LPP RequestAssistanceData.

LPP signaling may, for example, be employed to explicitly request DL-PRS parameters.

Furthermore, according to another embodiment, a user equipment for transmitting and receiving data in a wireless communication system is provided.

The user equipment is configured to receive, from a first network entity of the wireless communication system, assistance data comprising information on a plurality of resources of the wireless communication system.

Moreover, the user equipment is configured to receive configuration information from the first network entity or from a second network entity of the wireless communication system; wherein the configuration information comprises information on one or more proper subsets of the plurality of resources, wherein each of the one or more proper subsets comprises at least one of the plurality of resources.

Furthermore, the user equipment is configured to determine at least one of the one or more proper subsets depending on a (e.g., selection) criterion.

The criterion is indicated by the configuration information and/or is selected depending on the one or more measurements.

For example, pre-configured DL-PRS assistance data may, e.g., be associated with a validity area, for example, in LPP.

In an embodiment, such assistance data may, e.g., be employed for RRC broadcast.

Moreover, in a further embodiment, a user equipment for transmitting and receiving data in a wireless communication system is provided.

The user equipment is configured to request from the first network entity information on assistance data and/or is configured to request an update on previously configured information on the assistance data.

Furthermore, the user equipment is configured to receive from the first network entity or from the second network entity a configuration message comprising configuration information, wherein the configuration information comprises information on one or more downlink reference signals of a group of downlink reference signals.

Moreover, the user equipment is configured to receiving from a base station the one or more downlink reference signals.

Furthermore, the user equipment is configured to determine, depending on the configuration, a proper subset of the group of downlink reference signals.

Moreover, the user equipment is configured to perform and/or to report one or more measurements on the proper subset of the group of downlink reference signals; or the user equipment is configured to refrain from using a part of the proper subset of the group of downlink reference signals.

For example, the user equipment may, e.g., send a request for assistance data after receiving DL-PRS parameters.

Furthermore, in another embodiment, a user equipment for transmitting and receiving data in a wireless communication system is provided.

The user equipment is configured to receive, from a first network entity of the wireless communication system, assistance data comprising information on a plurality of resources of the wireless communication system.

The user equipment is configured to receive configuration information from the first network entity or from a second network entity of the wireless communication system. The configuration information comprises information on one or more proper subsets of the plurality of resources, wherein each of the one or more proper subsets comprises at least one of the plurality of resources.

Depending on the configuration information, the user equipment is configured to perform one or more measurements on one or more of the plurality of resources.

The one or more proper subsets comprise one or more first subsets of the plurality of resources; wherein, after receiving the configuration information, the user equipment is configured to not perform any measurement on any of the plurality of resources that are not comprised by the one or more first subsets, and is configured to perform the one or more measurements on one or more of the plurality of resources that are comprised by the one or more first subsets.

And/or, the one or more proper subsets comprise one or more second subsets of the plurality of resources; wherein, after receiving the configuration information, the user equipment is configured to not perform any measurement on any of the plurality of resources that are comprised by the one or more second subsets; and is configured to perform the one or more measurements on one or more of the plurality of resources that are not comprised by the one or more second subsets.

Moreover, according to an embodiment, a network entity for transmitting and receiving data in a wireless communication system is provided. A user equipment is configured to receive, from the network entity or from another network entity, assistance data comprising information on a plurality of resources of the wireless communication system.

The network entity is configured to transmit configuration information to the user equipment; wherein the configuration information comprises information on one or more proper subsets of the plurality of resources, wherein each of the one or more proper subsets comprises at least one of the plurality of resources.

According to an embodiment, the one or more proper subsets comprise one or more first subsets of the plurality of resources; wherein the one or more first subsets indicate that, after receiving the configuration information, any measurement on any of the plurality of resources that are not comprised by the one or more first subsets shall not be performed and/or shall not be reported, and/or wherein the one or more first subsets indicate that the one or more measurements on one or more of the plurality of resources that are comprised by the one or more first subsets shall be performed and/or shall be reported. And/or, the one or more proper subsets comprise one or more second subsets of the plurality of resources; wherein the one or more second subsets indicate that, after receiving the configuration information, any measurement on any of the plurality of resources that are comprised by the one or more second subsets shall not be performed; and/or wherein the one or more second subsets indicate that the one or more measurements on one or more of the plurality of resources that are not comprised by the one or more second subsets shall be performed and/or shall be reported.

In an embodiment, the plurality of resources comprise a plurality of downlink resources of the wireless communication system. The assistance data may, e.g., comprise information on the plurality of downlink resources of the wireless communication system. The one or more proper subsets comprise at least one of the plurality of downlink resources.

According to an embodiment, the plurality of downlink resources comprise a plurality of downlink reference signal resources of the wireless communication system; wherein the assistance data may, e.g., comprise information on the plurality of downlink reference signal resources of the wireless communication system; wherein the one or more proper subsets comprise at least one of the plurality of downlink reference signal resources. And/or, the plurality of downlink resources comprise a plurality of physical downlink control channel resources of the wireless communication system, wherein the assistance data may, e.g., comprise information on the plurality of physical downlink control channel resources of the wireless communication system, wherein the one or more proper subsets comprise at least one of the plurality of physical downlink control channel resources. And/or, the plurality of downlink resources comprise a plurality of physical downlink shared channel resources of the wireless communication system, wherein the assistance data may, e.g., comprise information on the plurality of physical downlink shared channel resources of the wireless communication system, wherein the one or more proper subsets comprise at least one of the plurality of physical downlink shared channel resources. And/or, the plurality of downlink resources comprise a plurality of physical broadcast channel resources of the wireless communication system, wherein the assistance data may, e.g., comprise information on the plurality of physical broadcast channel resources of the wireless communication system, wherein the one or more proper subsets comprise at least one of the plurality of physical broadcast channel resources.

In an embodiment, at least one of the one or more proper subsets may, e.g., comprise two or more of the plurality of resources. The configuration information indicates that the two or more of the plurality of resources belong to the at least one of the one or more proper subsets.

According to an embodiment, the one or more proper subsets comprise a plurality of downlink reference signal resources of one or more resources sets of a single base station and/or of a single frequency layer.

In an embodiment, the one or more proper subsets comprise a plurality of downlink reference signal resources of one or more resources sets of two or more base stations and/or of two or more frequency layers.

According to an embodiment, the assistance data may, e.g., comprise information that may, e.g., be hierarchically organized in two or more layers. Each of the two or more layers may, e.g., comprise one or more information nodes. For at least one of the two or more layers, each of the one or more information nodes of said layer provides information on one of the plurality of resources.

In an embodiment, the configuration information may, e.g., comprise information on the one or more proper subsets, such that for each proper subset of the one or more proper subsets, the information defines which of the information nodes of a single, same layer of the two or more layers belong to the proper subset, without defining which elements of other layers of the two or more layers belong to the proper subset. Or, the configuration information may, e.g., comprise information on the one or more proper subsets, such that for each proper subset of one or more of the one or more proper subsets, the information defines which of the information nodes of at least two layers of the two or more layers belong to the proper subset.

According to an embodiment, the configuration information defines the one or more proper subsets independent of an order of the information provided over a single layer of the two or more layers of the assistance data.

In an embodiment, the network entity may, e.g., be configured to transmit the assistance data and the configuration information to the user equipment in a single message.

According to an embodiment, the network entity may, e.g., be configured to transmit the assistance data to the user equipment in a first message and the configuration information to the user equipment in a different second message.

In an embodiment, the configuration information may, e.g., comprise information on two or more proper subsets of the plurality of resources. A first one of the two or more subsets may, e.g., be associated with a first one of two or more positioning methods. A second one of the two or more subsets may, e.g., be associated with a different, second one of two or more positioning methods.

According to an embodiment, the two or more positioning methods comprise at least two positioning methods of the following positioning methods:

a positioning method depending on a time difference of arrival, a positioning method depending on an angle of departure, a positioning method depending on an angle of arrival, a positioning method depending on a round trip time.

In an embodiment, each of the plurality of resources may, e.g., be associated with one of a plurality of beams. The configuration information may, e.g., comprise the information on the one or more proper subsets, wherein the one or more proper subsets comprise one or more of the plurality of resources, which may, e.g., be associated with one or more first beams of the plurality of beams, and does not comprise one or more other resources of the plurality of resources, which may, e.g., be associated with one or more second beams of the plurality of beams.

According to an embodiment, the configuration information may, e.g., depend on a beam direction and an expected coverage of one or more of the plurality of beams. And/or, the configuration information may, e.g., depend whether or not a line-of-sight condition may, e.g., be valid for one or more of the plurality of beams. And/or, the configuration information may, e.g., depend on an azimuth angle and/or an elevation angle and/or an antenna gain per azimuth and/or per elevation of one or more of the plurality of beams.

In an embodiment, the configuration information may, e.g., comprise the information on the one or more proper subsets, wherein each of the one or more proper subsets may, e.g., comprise two or more downlink reference signal resources from a single base station. Or, the configuration information may, e.g., comprise the information on the one or more proper subsets, wherein each of the one or more proper subsets may, e.g., comprise one or more downlink reference signal resources of a first base station and one or more downlink reference signal resources of a different, second base station.

According to an embodiment, the network entity may, e.g., be configured to determine the one or more proper subsets depending on one or more beam directions of one or more beams and/or depending one or more line of sights of at least one of the plurality of resources. And/or, the network entity may, e.g., be configured to determine the one or more proper subsets depending on a downlink reference signal coverage. And/or, the network entity may, e.g., be configured to determine the one or more proper subsets depending on downlink positioning reference signal beam information from one multi-antenna base station. And/or, the network entity may, e.g., be configured to determine the one or more proper subsets depending on assumptions on an environment. And/or, the network entity may, e.g., be configured to determine the one or more proper subsets depending on motion information on the user equipment.

In an embodiment, the configuration information may, e.g., comprise the information on the one or more proper subsets, wherein the one or more proper subsets depend on a predicted estimation of a future position of the user equipment which may, e.g., depend on motion information for the user equipment.

According to an embodiment, the configuration information indicates, for at least one of the plurality of resources association data, wherein the association data indicates for the one or more proper subsets an indication of one or more geographical areas, within which the one or more proper subsets are expected to be measured.

In an embodiment, the indication of the one or more geographical areas may, e.g., comprise one or more of the following:

a RAN notification area and/or a Tracking area, a system information area, a positioning system information area, a cell, a portion of a cell, or a portion of the RAN notification area or a portion of a the system information area or a portion of the positioning system information area, for example, denoted by an area identifier.

According to an embodiment, the network entity may, e.g., implement a location management function or may, e.g., be a location server.

In an embodiment, the network entity may, e.g., be a base station.

According to an embodiment, the network entity may, e.g., be a user equipment.

Moreover, a wireless communication system may, e.g., be provided The wireless communication system may, e.g., comprise a user equipment according to one of the above-described embodiments, and a network entity according to one of the above-described embodiments. The user equipment may, e.g., be configured to receive, from the network entity or from another network entity, assistance data comprising information on a plurality of resources of a wireless communication system. The network entity may, e.g., be configured to transmit configuration information to the user equipment; wherein the configuration information may, e.g., comprise information on one or more proper subsets of the plurality of resources, wherein each of the one or more proper subsets may, e.g., comprise at least one of the plurality of resources. Depending on the configuration information, the user equipment may, e.g., be configured to perform and/or to report one or more measurements on one or more of the plurality of resources.

A proper subset of the plurality of resources, wherein the proper subset comprises at least one of the plurality of resources, may, e.g., be a subset that comprises at least one of the plurality of resources, but that does not comprise all of the plurality of resources. Thus, if the plurality of resources comprises, for example, five resources, a proper subset with at least one of the plurality of resources comprises at least one and at most four of the resources of the plurality of resources. The one or more first subsets and/or the one or more second subsets are proper subsets.

According to an embodiment, the plurality of resources may, e.g., comprise a plurality of downlink resources of the wireless communication system. The assistance data may, e.g., comprise information on the plurality of downlink resources of the wireless communication system. The one or more proper subsets may, e.g., comprise at least one of the plurality of downlink resources.

In an embodiment, the plurality of downlink resources may, e.g., comprise a plurality of downlink reference signal resources of the wireless communication system. The assistance data may, e.g., comprise information on the plurality of downlink reference signal resources of the wireless communication system. The one or more proper subsets may, e.g., comprise at least one of the plurality of downlink reference signal resources.

According to an embodiment, the plurality of downlink resources may, e.g., comprise a plurality of physical downlink control channel resources of the wireless communication system. The assistance data may, e.g., comprise information on the plurality of physical downlink control channel resources of the wireless communication system. The one or more proper subsets may, e.g., comprise at least one of the plurality of physical downlink control channel resources.

In an embodiment, the plurality of downlink resources may, e.g., comprise a plurality of physical downlink shared channel resources of the wireless communication system. The assistance data may, e.g., comprise information on the plurality of physical downlink shared channel resources of the wireless communication system. The one or more proper subsets may, e.g., comprise at least one of the plurality of physical downlink shared channel resources.

According to an embodiment, the plurality of downlink resources may, e.g., comprise a plurality of physical broadcast channel resources of the wireless communication system. The assistance data may, e.g., comprise information on the plurality of physical broadcast channel resources of the wireless communication system. The one or more proper subsets may, e.g., comprise at least one of the plurality of physical broadcast channel resources.

According to an embodiment, the network entity may, e.g., implement a location management function or may, e.g., be a location server.

In an embodiment, the network entity may, e.g., be a base station.

According to an embodiment, the network entity may, e.g., be a user equipment.

In the following, particular examples for a network entity/node according to some embodiments are described.

The network node/network entity may be an LMF (Location Management Function) or an LS (Location Sever) located in the core network or a local-LMF. The LMF may manage the support of different location services for target UEs, including positioning of UEs and delivery of assistance data to UEs. The LMF may receive or provide also assistance data from/to the BSs (beam information, for example). The LMF may interact with the serving BS for a target UE in order to obtain position measurements for the UE, including uplink measurements made by a BS. The LMF may also interact with other BSs able to receive signals from the UE or transmitting signals to the UE (neighbouring-BSs). In contrast to the serving-BS the neighbouring-BS may not able to exchange control information with the UE. Each neighbouring-BS may become temporally a serving-BS.

The network node may interact with a target UE in order to deliver assistance data if requested for a particular location service, or to obtain a location estimate if that was requested. The network node may interact with multiple BSs to provide assistance data.

For positioning of a target UE, the network node may decide on the position methods to be used, based on factors that may include the LCS (location services support) Client type, the required QoS, UE positioning capabilities, BS positioning capabilities. Furthermore, the network may use different positioning methods or combinations of it, depending on the propagation channel conditions or the target accuracy. A first positioning method may yield a first location estimate and may assist a second positioning method. For example, for UE-based position methods may use information from the network-based positioning methods or vice-versa. The network node may combine all the received results and determine a single location estimate for the target UE (hybrid positioning), or may derive reliability information. Additional information like accuracy of the location estimate and velocity may also be determined.

In the following, particular examples for a base station (BS) according to some embodiments are described.

The BS is a network element of the Radio Access Network (RAN) or the Next Generation Radio Access Network (NG-RAN) that may provide measurement information for a target UE and communicates this information to a network node. To support RAT-Dependent positioning, the BS may transmit reference signals (RS) and may make measurements on radio signals for a target UE or a Reference device, and provide measurement results for position estimation. A BS may serve several BSs or TRPs, including for example remote radio heads, reception-only points (RPs) and transmission-only points (TPs). A BS may assistance data information, received from an LMF, in positioning System Information messages. The assistance data may be UE specific or applicable for several UEs and may be delivered to the UE in unicast or broadcast modes.

In some scenario, a set of the TRPs are not static (or non-stationary). The non-stationary TRP position (and orientation) or trajectory can be known at the core network or at the TRP itself and can be taken into account for positioning and data communication applications. In an example the non-stationary TRP is a Non-Terrestrial Network (NTN) or Aerials Network (drones) or a vehicle or a moving device wherein the position of the transmit antenna corresponding to non-stationary TRP at the time of transmission or reception is known to the positioning entity (UE in UE-based mode and Network node in UE-assisted or Network-based modes).

In the following, particular examples for Downlink Reference Signals (DL_RSs) according to some embodiments are described.

Downlink Reference Signals (DL-RS(s)) described herein as reference signals transmitted from an apparatus being a base-station, reference device or positioning TRP/TP or the like. DL-RSs may be used to enable downlink positioning measurements for DL methods or UL and DL methods such as TDOA, RTT, multi-RTT or DL-AoD. DL-RS(s) may be referred to those skilled in the art as DL-PRS, LTE PRS, SL-PRS or any downlink or sidelink reference signal used for the purpose of positioning. Furthermore, other DL-RS (SSB, CSI-RS, etc.) can be also used as RS for positioning or related functions (synchronisation, for example). A RS may be a composite of several RS and is called (DL-)RS Resource Set in the 3GPP standard. The RS Resources in a DL-RS resource set may be associated with the same TRP or frequency layer. A DL-RS resource ID be assigned to each resource of a resource set. Each DL-PRS Resource ID in the DL PRS Resource Set can be associated with a specific spatial filter. A TRP may be configured with multiple DL-RS Resource Sets. A DL RS resource set consists of one or more DL RS resources and it is defined by multiple parameters. The Information Element Periodicity-and-ResourceSetSlot-Offset-r16 defines the DL PRS resource periodicity per PRS Resource Set. All the DL-RS resources within one DL-RS resource set are configured with the same DL PRS resource periodicity. Where semi-persistent scheduling allocates DL resources with a certain period over a defined interval. For the case of aperiodic DL RS, a periodicity value is not configured.

A BS or a TRP may transmit multiple DL-RS resource sets, each comprising multiple DL-RS resources. A DL-RS resource set would be a collection of beams (DL-RS resources) transmitted with a configured periodicity in configured offsets. Some sets would be configured with given periodicity. Since each DL-RS resource set is associated with a periodicity, each instance would span a continuous set slots. Each PRS resource of a DL-RS resource set would have a configured offset with respect to the SFN=0.

A DL-RS positioning frequency layer is defined as a collection of DL-RS resource sets that have common parameters configured by PositioningFrequencyLayer.

The DL-RS resources and resource set configurations are provided to the target UE on a higher layer interface such as LPP from the LMF or possibly from a serving cell over an RRC or MAC-CE or DCI interface. The target UE performs the measurements on the configured DL-RS resources.

The UE or a reference device may be configured for measurements on one or more DL-PRS or SL-PRS resources. The configuration may be provided to the UE with a high layer configuration message which includes assistance information on the DL-RS(s) resources transmitted from one or more BS or TRP. The assistance information for the DL-RS(s) may include one or more of the following information ResourceSet, ResourceSetId, Periodicity, ResourceRepetitionFactor, ResourceTimeGap, SFNO-Offset, ResourceSetSlotOffset, Resource, ResourceId, SequenceId, CombSizeN, ReOffset, ResourceSlotOffset, Resource-SymbolOffset, NumSymbols, QCL-Info, SubcarrierSpacing, CyclicPrefix, ResourceBandwidth, StartPRBDL-RS-PointA, RstdReferenceInfo, RstdMeasurementInfoRequest, UE-Rx-Tx-MeasurementInfoRequest, expectedRSTD, RSTD-uncertainty, MutingPattern.

A configuration entity being the network entity or a serving Base Station may provide or update the UE or the reference device with DL-RS measurement configuration which are indicated as IEs (Information Elements) over a higher layer interface like LPP for the case the configuration entity being an LMF or one of the following RRC, MAC-CE, DCI for the case the configuration entity being an Base Station or PC5 (Sidelink) interface for the case the configuration entity being an UE or a reference device.

The network entity may configure the BS or reference device for a transmission configuration on one or more DL-PRS or SL-PRS resources. The configuration entity provides the UE with a high layer configuration message which includes assistance information on the DL-PRS resources received from one or more TRPs. The configuration entity provides or updates the TRP with DL-PRS configuration which are indicated as IEs (Information Elements) over a higher layer interface like NRPPa for the case the configuration entity being an LMF or one of the following Xn, F1 or X2 for the case the configuration entity being a Base Station or PC5 (sidelink) interface for the case the configuration entity being an UE.

In the following, particular examples for SL PRS resources according to some embodiments are described.

The Sidelink (SL) reference signals SL-PRS are transmitted by a UE, reference device or a sidelink apparatus such a road side unit (RSU) and be a dedicated positioning reference signal such SL-PRS or SRS-for-positioning or a communication or synchronization reference signal used for the purpose of positioning such as SPSS or SSSS.

In the following, particular examples for a QCL relation according to some embodiments are described.

Two antenna ports are said to be quasi co-located (QCL) if properties of the channel over which a symbol on one antenna port is conveyed can be inferred from the channel over which a symbol on the other antenna port is conveyed.

Spatial parameter(s) for QCL in NR describes the spatial channel properties of the RS antenna ports observed at the receiver which can consider one or more of the following the parameters: Angle of Arrival (AoA), Dominant AoA, average AoA, Power Angular Spectrum (PAS) of AoA, Angle of Departure (AoD), average AoD, PAS of AoD, transmit/receive channel correlation, transmit/receive beamforming, spatial channel correlation etc.

Main UE Method

The UE may receive from a network entity, assistance data to enable the UE to perform measurements on one or more DL-RS(s). The UE may receive an indication to perform a measurement on one or more DL-RS(s). The assistance data for the DL-RS reception may include an indication on the association of one or more DL-RS resource (s), each with a resource identifier within a resource-set with a resource-set identifier. Additionally, the information may also include association of the resources or the resource-set with a BS identifier. The information may, moreover, include an association of the resources, resource-set or BS identifiers with a frequency layer having a frequency layer identifier. The UE expects that one DL-RS resource can be associated with a single resource-set, a single BS and a single frequency layer. A UE may be configured to perform measurements on the same BS over multiple frequency layers.

In the following, particular embodiments for a method performed by a UE are described.

In accordance with embodiments, a method performed by a UE is provided, wherein the method comprises:

Receiving from a network entity (e.g., LMF) at least one assistance message indicating a group of DL-RSs, and;

Receiving from the network entity or a second entity at least one configuration message {indication/information} indicating one or more DL-RSs of the group of DL-RSs, and Receiving from the BSs one or more DL-RSs Determining depending on the configuration message a subset of the provided DL-RSs group to perform measurement on this subset or refraining from using a part of the subset In corresponding embodiment, the configuration message includes an information that two or more DL-RS belong to same subset.

The UE can be triggered to perform specific measurements on one or more DL-RS(s) conditioned that the UE measured the DL-RS(s) with certain characteristics. For example, when the NW is aware of the environment and channel reception characteristics for a subset of DL-RS(s) in the group, the UE shall only perform measurement on the DL-RS(s) in this subset. The measurement can include power delay profile information, channel impulse response (CIR) reports, or phase measurements on the first arrival path.

In corresponding embodiment, the configuration message includes an indication that at least one DL-RS within the group trigger a measurement or a method by the UE.

Assistance data (e.g., of the assistance message) may for example, be data from one or more TRPs with a TRP identifier and a DL-RS identifier.

In an example, the UE may be configured to perform measurements on DL-RS resources on one or more resource sets from the same BS and on one frequency layer. In another example, the UE may be configured to perform measurements on DL-RS resources on one or more resource sets from multiple BS and/or multiple frequency layers. The UE receives assistance data including one or more DL-RSs identifiers and accordingly the resources configuration of the corresponding DL-RS resources and/or resource-sets. The assistance data may, e.g., comprise an indication on the BS and on a frequency layer.

Figure 3:
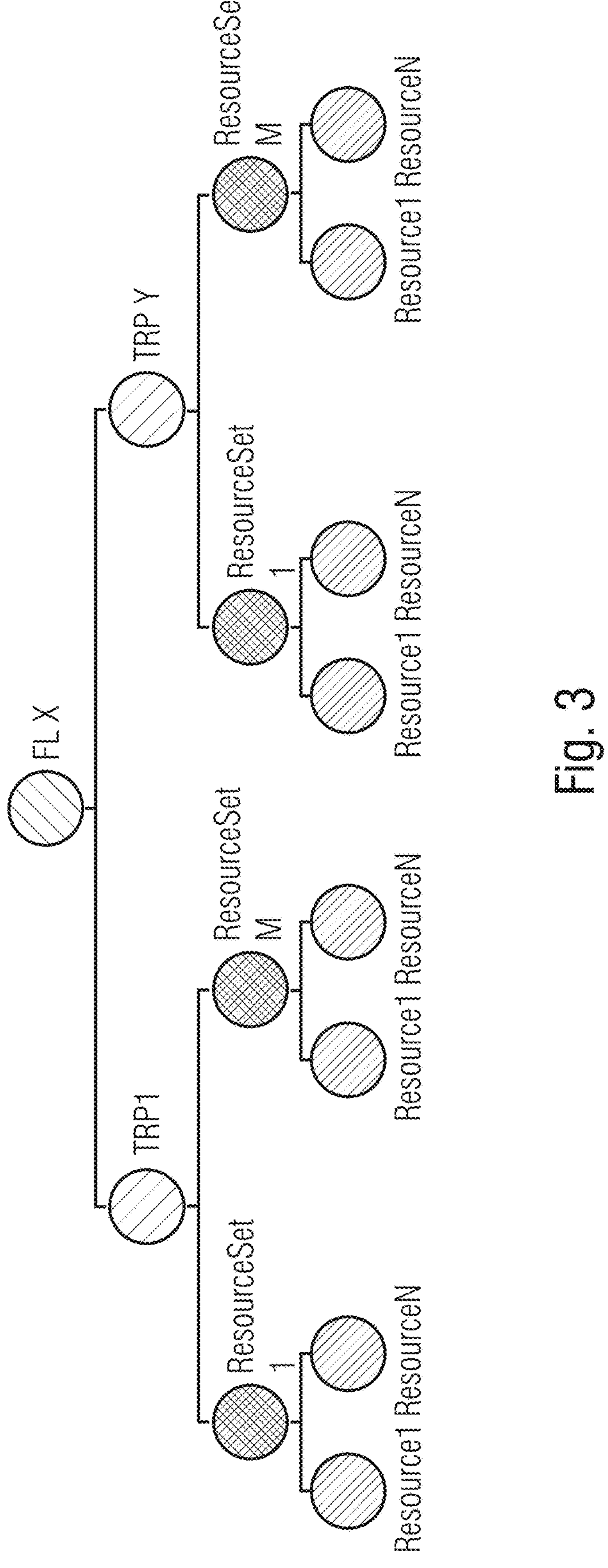
FIG. 3 illustrates an example for a part of the DL Assistance-Data, DL-AD, provided to a UE.

FIG. 3 illustrates DL-AD assistance data for 1 frequency layer, Y TRPs, M resource sets and N resources. In particular, FIG. 3 is illustrating an example for a part of the DL Assistance-Data (DL-AD) provided to a UE. The DL-AD information may be in some scenarios UE specific and in other scenarios broadcasted to multiple UEs. The UE may assume in some scenarios that the provided DL-AD is sorted in one layer (resource layer, TRP/BS layer . . . ) according to priority. It should be noted that the number of BSs between different FLs, the number of resource sets between different BSs and the number of resources between different resources set may vary.

The term "layer" used in the description is to illustrate procedure done at a one level, or layer that can be a resource layer; resource set layer, TRP/BS layer, or frequency layer.

The configuration message include an indication of the DL-RSs belonging to a single layer or across different layers. The configuration message may, e.g., comprise at least one resource identifier and frequency layers identifiers, TRP ID identifiers, and resource set identifiers. A configuration message may, for example, comprise such an indication and/or information.

In an embodiment, the UE receives information including one or more indications that can be mapped to at least one DL-RS resources, resource set, BS or FL; wherein the information in is independent of the order of the information provided over a single layer in the DL-AD. The UE receives information including association or an indication on the DL resources independent of the DL-RS resources arrangement in the provided DL-AD.

In an embodiment, the UE receives information including one or more indications that can be mapped to at least one DL-RS resources, resource set, BS or FL; wherein the information in provides additional non-sequential ordered information provided over a single layer in the DL-AD. The UE applies the ordered information received from the network entity and the additional information to determine the subset of DL-RS resources to apply.

Figure 4:
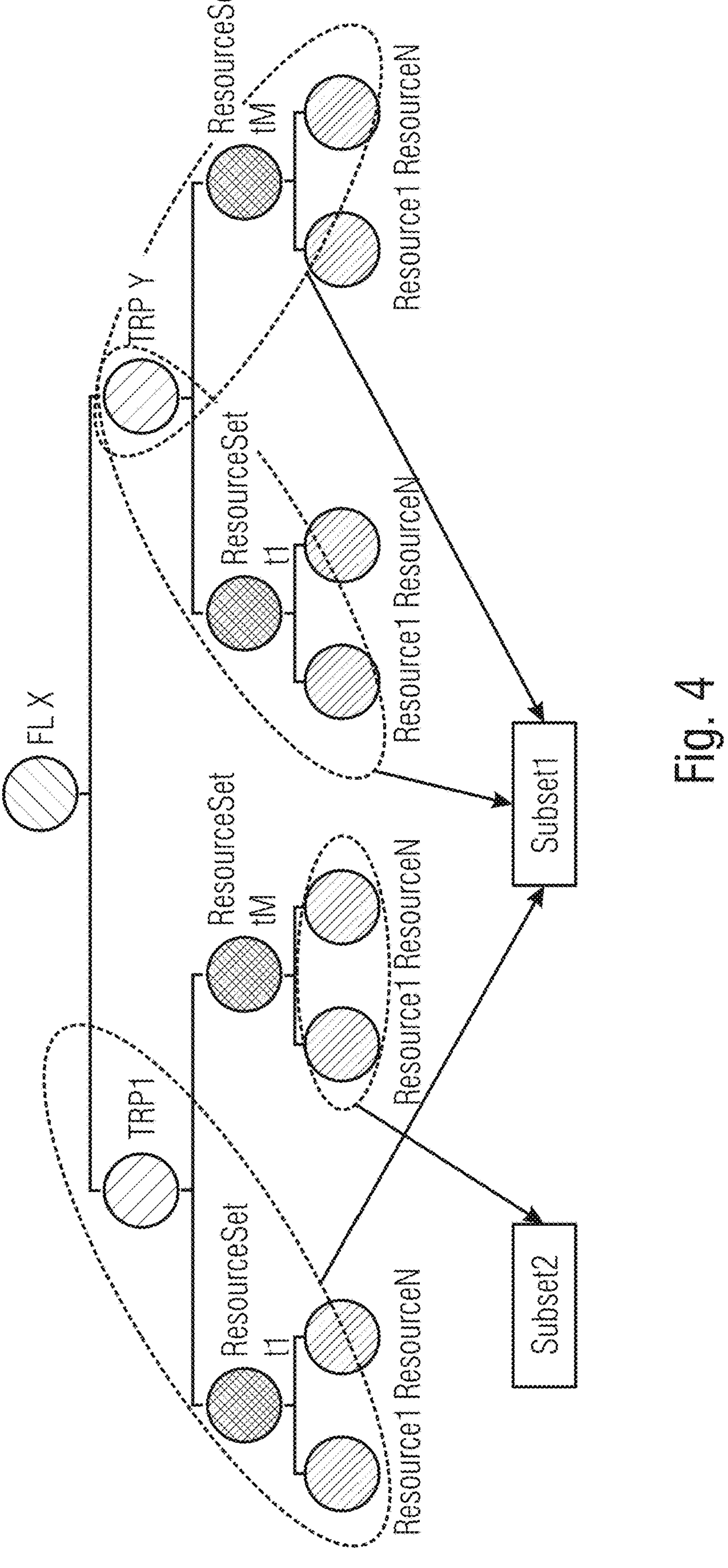
FIG. 4 illustrates a subset indication.

FIG. 4 illustrates a subset indication.

When a UE receive the DL AD, the UE may determine to make use of the ordered DL-RSs in a single layer that can indicate a general priority information together with the information to determine the subset of DL-RSs for performing a measurement or for measurement reporting.

In accordance with embodiments, the indication comprises at least one or more identifier(s), ID(s), of one or more DL resource(s) and/or DL resource set(s) and/or TRP/BS and/or frequency layer from the DL-AD set in to indicate which subset of the DL-RS may be grouped for the measurement of one or more DL resource(s) and/or the reporting of measurements of one or more DL resource(s).

In one aspect, the UE may be expected to select the DL-RS subset triggered by a criterion. The criterion can be the selection of a group of the indicated resources based on performed RSRP (radio signal received power) measurements on the DL-RSs. Additionally or alternatively, the criteria can be the selection of a group of the indicated resources based on performed TOA (time of arrival) measurements on the DL-RSs. The UE behavior on the selection of the one or more subsets can be part of a UE implementation or specified in the specification.

Figure 5:
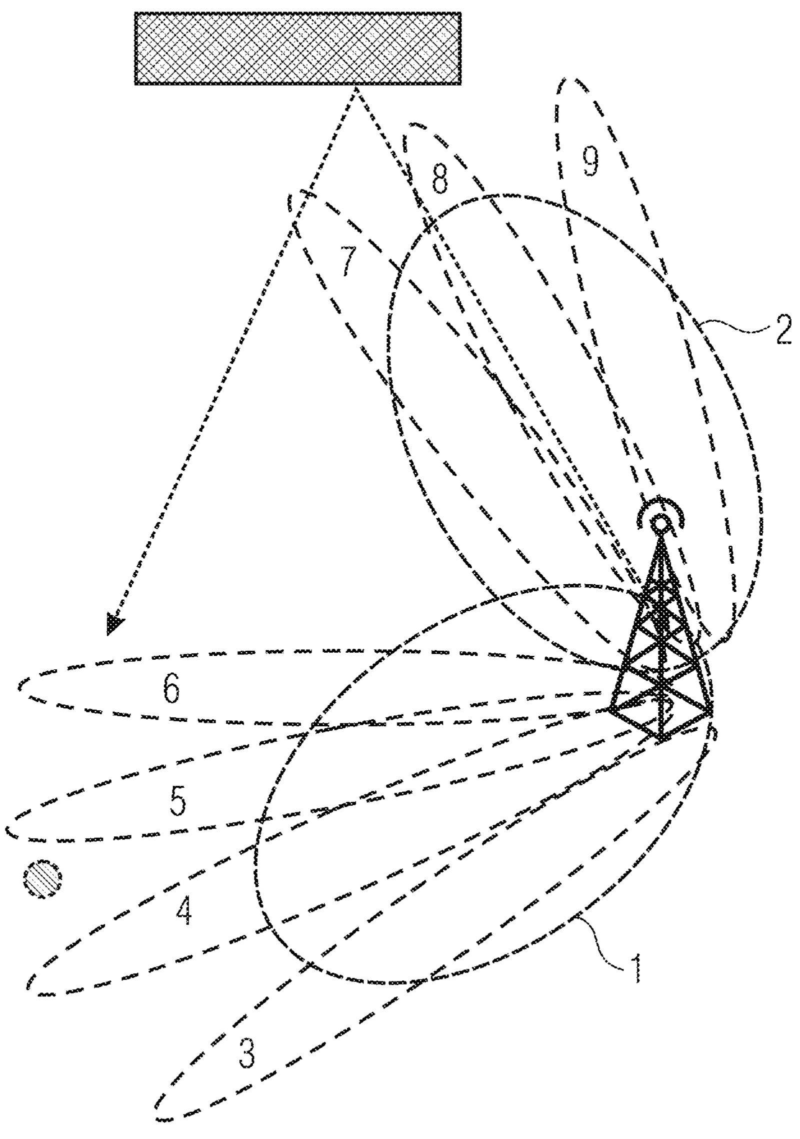
FIG. 5 illustrates an example on DL-AoD with a single TRP.

FIG. 5 illustrates an example on DL-AoD with a single TRP (number of PRS resources in FIG. 5 is only for visualization purposes).

Figure 2:
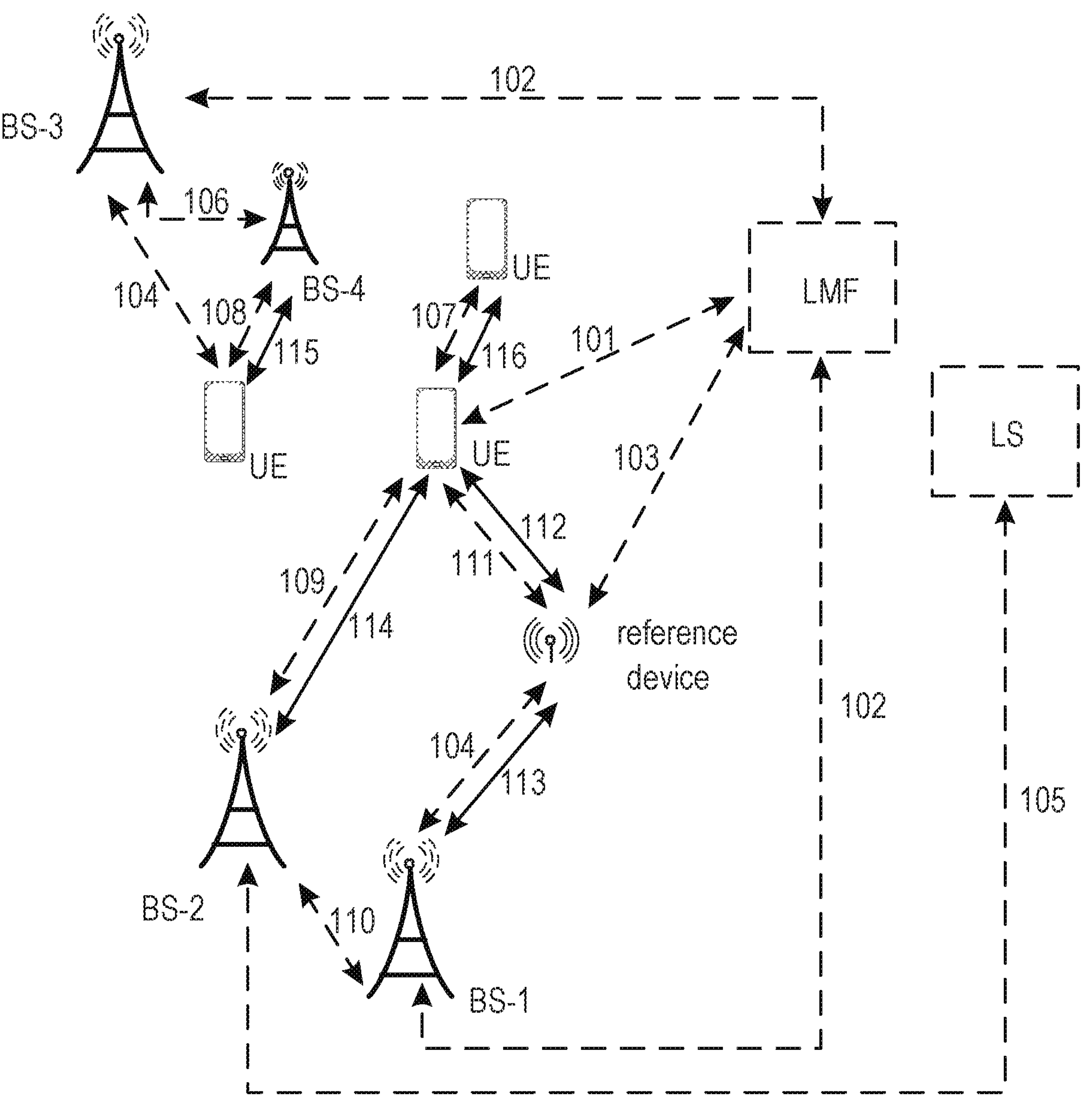
FIG. 2 illustrates a schematic representation of a wireless positioning communication system.

In particular, FIG. 5 illustrates an example on a DL-AoD; the UE receives a DL-AD information on DL-RSs transmitted from a single BS on a single FL and a single resource set and 6 DL-RS resources. The DL-RSs have IDs from 1, 2, 3, 4, 5, 6, 7, 8, 9 (only a part is shown in FIG. 2) . . . . The UE has capability of measuring a number of DL-RSs and uses the DL-RS resources order to select the DL-RS to perform measurements on. Optimally for this scenario, the UE will measure DL-RS resource 1, 4, 5, and 6 however since the NW does not know the UE position the DL-AD is rather general. The UE receives from the NW the information indicating those two subsets where the DL-RSs are mapped, for example:

Subset1 include DL-RS resource IDs 1, 3, 4, 5 and 6

Subset2 include DL-RS resource IDs 2, 7, 8 and 9.

The UE may measure DL-RS 1 and 2 as indicated by the priority order, and based on the criteria (RSRP, TOA, signal quality) to select the subset that DL-Resource ID 1 belongs to. The ToA as criterion in this example can be useful when the DL-RS resources in NLOS or multipath conditions have a higher RSRPS than DL-RS in LOS (line-of-sight) conditions. The technical advantage is that the UE is aware of the DL-RSs relevant together as a subset. The UE otherwise performs multiple measurements and reports adding more resources, complexity and latency. The UE position may also change, hence providing the UE with the indication information may be vital for the further processing of the DL-RS(s) at a given time instant.

The description provided in FIG. 5 is for illustration only and do not limit the scope of the disclosure to any particular configuration.

In one aspect, the UE may receive multiple indication information for each positioning method where each indication has a different subset assignment. The UE may also receive multiple indication information for a single positioning method where each indication has a different subset assignment.

In another aspect, the UE may be informed by the NW to refrain from using the one or more DL-RS resources. This can be helpful if the NW is for example aware of certain channel conditions that degrades the performance in some areas.

In an embodiment, the UE receives information including one or more indications which can be mapped to at least one DL-RS resources, resource set, BS or FL; wherein the information in indicates the UE to refrain from using one or more DL-RS(s) over a single or multiple layer from the group of DL-AD provided to the UE.

In one aspect, the information on the DL-RSs properties is independent TRP QCL configuration for receiving on or more DL-RS(s).

In the following, particular embodiments for usages of a UE-assisted mode, of a UE-based mode and for communication are described.

The UE may be configured with one or more positioning methods in UE-assisted (UE-A) mode. The UE in UE-A mode reports measurements such as RSRP for DL-AoD, RSTD (reference signal time difference) measurements for DL-TDOA, UE Rx-Tx measurement for RTT or any additional measurement. These measurement reports includes at least one of the DL-RS resources indicated in the information.

The UE may be configured with one or more positioning methods in UE-based (UE-B) mode. The UE in UE-B mode applies measurements such as RSRP for DL-AoD, RSTD measurements for DL-TDOA, UE Rx-Tx measurement for RTT or any additional measurement to determine its own position. These measurement reports include at least one of the DL-RS resources indicated in the information.

The UE may be configured with one or more reference signals from one or more BSs. The UE may use the indication information for sounding DLs channels and reporting a channel state information or selecting one more DL-channel based on the measurements which includes at least one of the DL-RS resources indicated in the information.

In the following, particular embodiments for configuration interfaces are described.

The present disclosure includes different options to provide the information to the target UE that depends on the availability of the information and usage scenario. The UE receives the DL-AD from a first entity and the information from a second entity.

As a first option, the UE receives information from the same network entity providing the AD. In this case, if the NW is being an LMF, the UE is provided with the information over the LPP interface. The information can be provided along with in a single configuration message. Alternatively the UE may receive a message including at a different time from receiving the message. Additionally, the network entity can update the information in or inform the UE to abandon one or more information configured in.

As a second option, the first entity can be in one scenario the Network entity such as LMF and the second entity being a SL-UE with sidelink communication with the target UE. The SL-UE may derive the DL-RS resources that are applicable according to the SL-UE measurements. The SL-UE may directly provide the information to the target UE over a sidelink interface such as PC5. In one sub-option, may either be derived by the SL-UE or transmitted to the target UE. In another sub-option, the information can be received from the NW entity by the SL-UE and forwarded to the target UE. In some examples, the SL-UE can be a reference UE with a known position at a given time.

Figure 6:
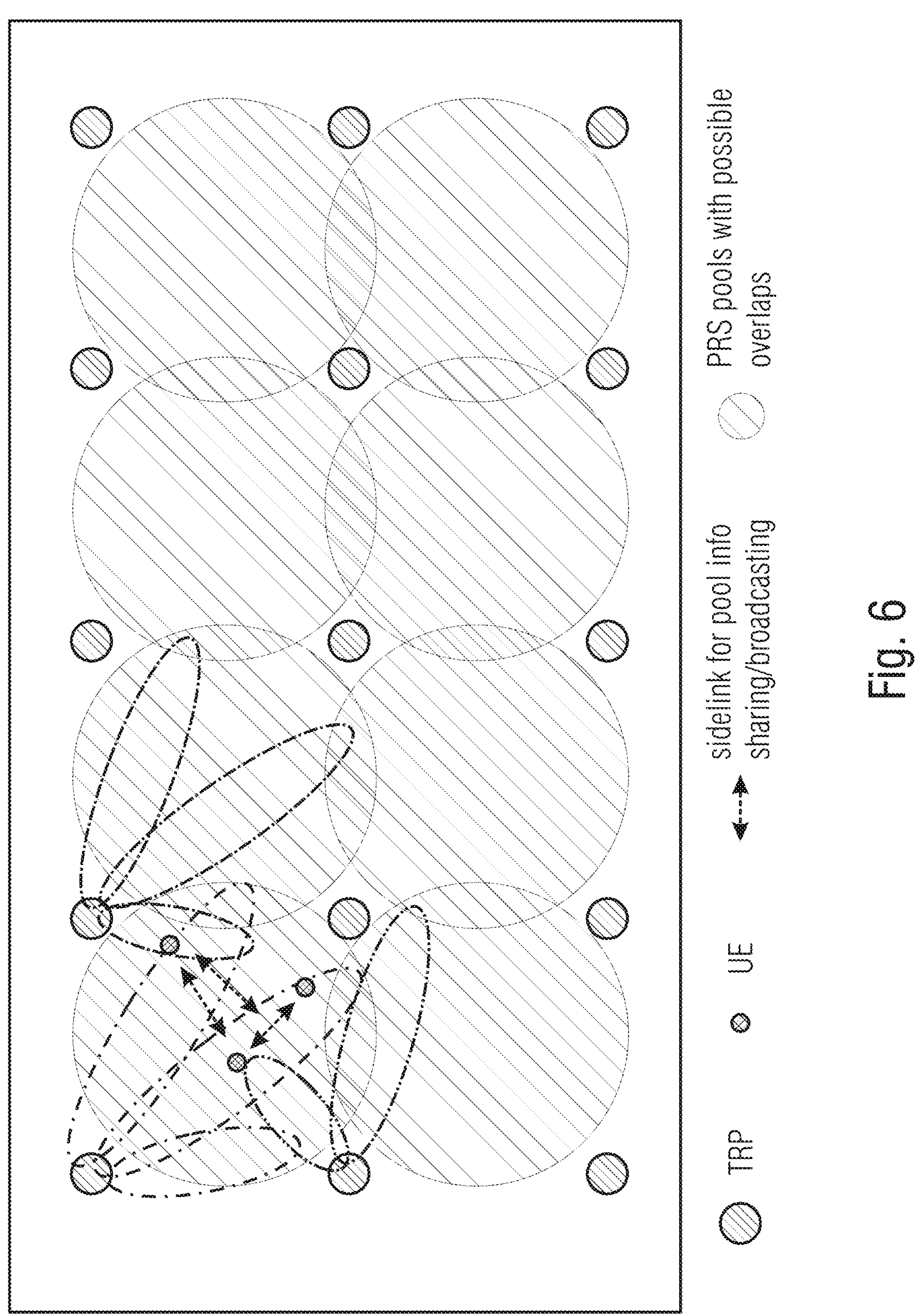
FIG. 6 illustrates an information exchange over the SL interface.

FIG. 6 illustrates an information exchange over the SL interface

In particular, FIG. 6 illustrates an example where the SL-UEs can assist in providing the information.

In the example of FIG. 6, it is illustrated how the DL-RS subsets, PRS pools, of multiple TRPs are in certain environment condition overlapping. A DL-RS resource, DL-RS resource set, TRP or frequency layer can be associated in multiple DL-RS subsets.

As a third option, the first entity can be in one scenario the Network entity such as LMF or a first s-gNB and the second entity being a second Network entity as LMF or a second s-gNB. The target UE may due movement require an update on the message from the new serving g-NB.

In one aspect, the NW entity may derive the information message based on measurement reports on the DL-RSs reported by a UE. Additionally or alternatively, the NW entity may derive the information message based on information provided by the UE, the information including certain DL-RSs identifiers wherein these identifiers cannot be derived directly from measurements (such as in in UE based mode or in case the UE did not select the measurements for a measurement report).

In one implementation, the NW entity can derive the information and provide it to other UEs where the information provided is applicable to the location of these UEs.

In the following, particular embodiments for Beam Group information are described.

Figure 7:
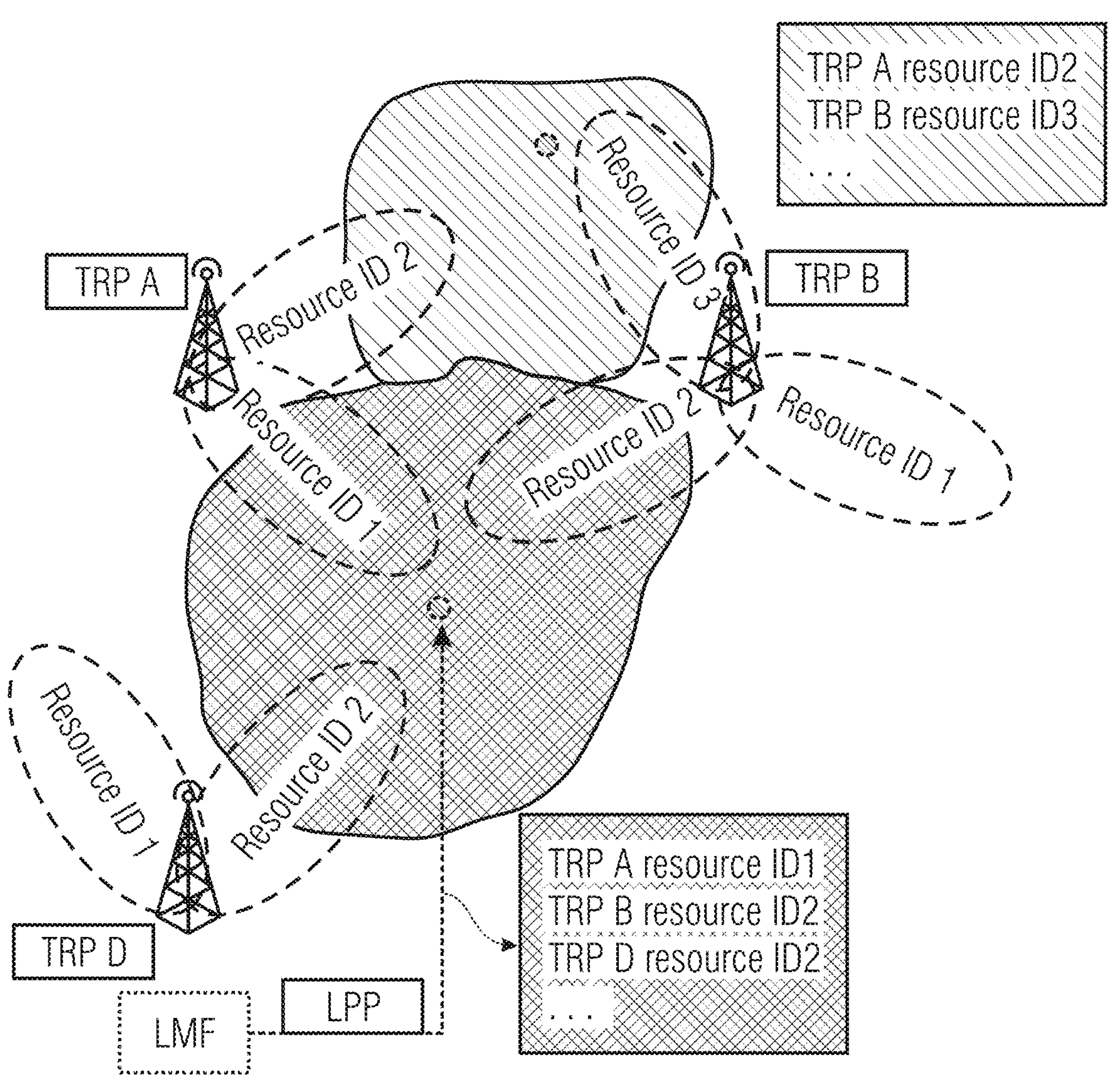
FIG. 7 illustrates DL-RSs in different geographical areas and information indicated to UEs.

FIG. 7 illustrates DL-RSs in different geographical areas and information indicated to UEs.

In particular, FIG. 7 illustrates an example where the positioning method involves multiple BSs where each BS (TRP) transmits one more DL-RSs at a certain time in a certain direction. The NW can provide information on the DL-RS that the UE can perform measurements to either reduce complexity or take into account certain constraint not known to a UE such as LOS-blockage or a deterministic reflector.

In one implementation, the information related to the configuration message is derived by a NW entity based on one or a combination of the following options, such as DL-RS LOS, transmit power and antenna beam characteristics, for example, DL-RS Coverage.

The network can determine the DL-RS subsets based on the beam direction and expected coverage. This can be achieved with use tools such are RF planning, raytracing or any similar analysis or system simulation tool, which include the DL-RS characteristics to determine the information by characterizing the DL-RSs with respect to the DL-RS transmit power and antenna beam characteristics.

With respect to DL-RS LOS condition, FIG. 7 illustrates an example where the network identities that the LOS condition is valid for Resources1, 2 and 2 transmitted from TRP-A, TRP-B and TRP-C are valid in one geographical area. Such information can be provided to a UE performing LOS-dependent positioning methods and relying on multiple-DL-RS reception such DL-TDOA, multi-RTT and DL-AoD. The network can determine the DL-RS based on the beam direction the expected LOS with respect to one or more DL-RS(s).

In an embodiment, the UE receives a configuration message including information on associated with multiple DL-RS(s), wherein the information allows the UE to identify the DL-RS in LOS conditions.

The UE uses the information in for DL-TDOA method to perform measurements on the identified DL-RS(s) and report the one or more RSTD measurements between one or more TRP and a Reference TRP. In UE based, the UE uses this information in a DL-TDOA method to perform measurements on the identified DL-RS(s) and compute its own position.

The UE uses the information in in DL-TDOA method to perform measurements on the identified DL-RS(s) and report the one or more RSTD measurements between one or more TRP and a Reference TRP. In UE based, the UE uses this information in a DL-TDOA method to perform RSTD measurements on the identified DL-RS(s) and compute its own position.

The UE uses the information in for DL-AoD method to perform measurements on the identified DL-RS(s) within the subset and report the one or more ToA, RSRP, or phase measurements on the first or later arrival path(es) from the same TRP. In UE based, the UE uses this information in a DL-AoD method to perform measurements on the identified DL-RS(s) and compute its own position.

The UE uses the information in in multi-RTT method to perform measurements on the identified DL-RS(s) and report the one or more UE Rx-Tx time difference measurements from one or more TRP and a Reference TRP. In UE based, the UE uses this information in a multi-RTT method to perform measurements on the identified DL-RS(s) and compute its own position.

Considering DL-PRS beam information from one TRP multi-antenna, the network can, for example, determine the DL-RS subsets based on the beam BS beam characteristics. A multi-antenna TRP can transmit one or more DL-RS where the DL-RS are non-Omni directional. The BS provides the network entity with the Azimuth and/or Elevation transmission angles and optionally the antenna gain per Azimuth/Elevation for each DL-RS resource or DL-RS resource set. The DL-RS beam information includes information on the direction and gain of the main lobe and optionally the one more sidelobes.

For DL-AoD methods, the UE is provided by the network with an indication on one or more subsets of DL-RSs within a group of DL-RSs wherein each subset includes at least two DL-RS from the same BS. The UE is expected to perform a measurement on the DL-RSs per subset based on a criterion chosen by the UE to select a subset from one or more DL-RS in the group of DL-RS resources.

For DL-AoD methods, the subsets of DL-RSs include are selected according to the Azimuth and/or Elevation information from at least the main lobe information on the transmitted DL-RS resources or resource sets.

For DL-AoD methods, the subsets of DL-RSs are selected according to the Azimuth and/or Elevation information using at least one sidelobe information on the transmitted DL-RS resources or resource sets.

In an example, the configuration message can be used for an indication of a group of DL-RS narrow beam within a wider beam or a number of wider beams.

For DL-TDoA methods, the UE is provided by the network with an indication on one or more subsets of DL-RSs within a group of DL-RSs wherein each subset includes at least two DL-RS from the different BSs. The UE is expected to perform a measurement on the DL-RSs per subset based on a criterion chosen by the UE to select a subset from one or more DL-RS in the group of DL-RS resources.

Regarding UE or BS reports and motion information, the network can, for example, determine the DL-RS subset based on the UE reports on the one or more DL-RS measurements. Additionally, the network can determine the DL-RS subset based on the BS reports on the one or more DL-RS measurements from DL-RS transmitted from other BSs or the on the one or more UL-RS measurements, e.g., from the UE.

The network can determine the DL-RS subset based on a predictive UE position estimates. The predictive UE position estimates can be derived from UE positioning engine or movement information such velocity, acceleration or displacement.

In the following, some exemplifying environmental assumptions are made.

Certain reflectors acting as multipath clusters are known to the network and can be used to enhance the position estimation of the target UE. Example of known reflector can be deterministic environmental clusters such as building or a traffic sign or a positioning specific cluster installed at a specific cite for positioning or communication purposes. An enhanced position is achieved when the network knows the position with a given certainty OR the DL-RS are common over multiple resources with respect to the reflecting cluster. In 5G positioning, the UE measures multiple DL-RSs and considers as a reference for positioning estimation or for measurement reporting the DL-RS are selected either to maximize the received power or to minimize the TOA or AOD error.

In an embodiment, the UE is indicated on the configuration message with a subset of DL-RS resources or resource sets within a group of resources to report measurements regardless of the LOS or RSRP condition.

In a corresponding embodiment, the UE is indicated on the configuration message with a subset of DL-RS resources or resource sets within a group of resources to report measurements common for the multiple DL-RS within the subset.

In an embodiment, the UE is indicated on the configuration message with a subset of DL-RS resources or resource sets within a group of resources to report additional measurements for the DL-RS subset than the DL-RS group. Wherein the measurement may include the TOA, DL-AOD, DL-AoA for the one or more reflecting clusters.

In some cases, the network is aware of a blockage condition and can inform the UE to avoid using the DL-RS for measurements or position estimation. As an example, the NW knows from the DL-RS characteristics in an environment that if a first DL-RS resource within a given subset are identified by the UE as reference then it is unlikely to receive a second DL-RS to be received in LOS conditions.

In an embodiment, the UE is indicated on the configuration message with a subset of DL-RS resources or resource sets within a group of resources to refrain from reporting measurements or applying the DL-RS for positioning estimation.

Optionally the UE may identify the need to for a DL-RS configuration information or to update a previous configuration.

In an embodiment, a method performed by the UE comprising:

Requesting from the NW entity information on DL-AD or requests an update on a previously configured DL-AD information.

Receiving from the network entity a configuration message information} on one or more DL-RSs of the group of DL-RSs, and receiving from the BSs one or more DL-RSs.

Determining based on the information in a subset of the provided DL-RSs group to perform measurement on this subset or refraining from using a part of the subset.

Regarding Moving UE, a method from providing a moving UE in advance with the mechanism to measure certain DL-RS is provided.

Figure 8:
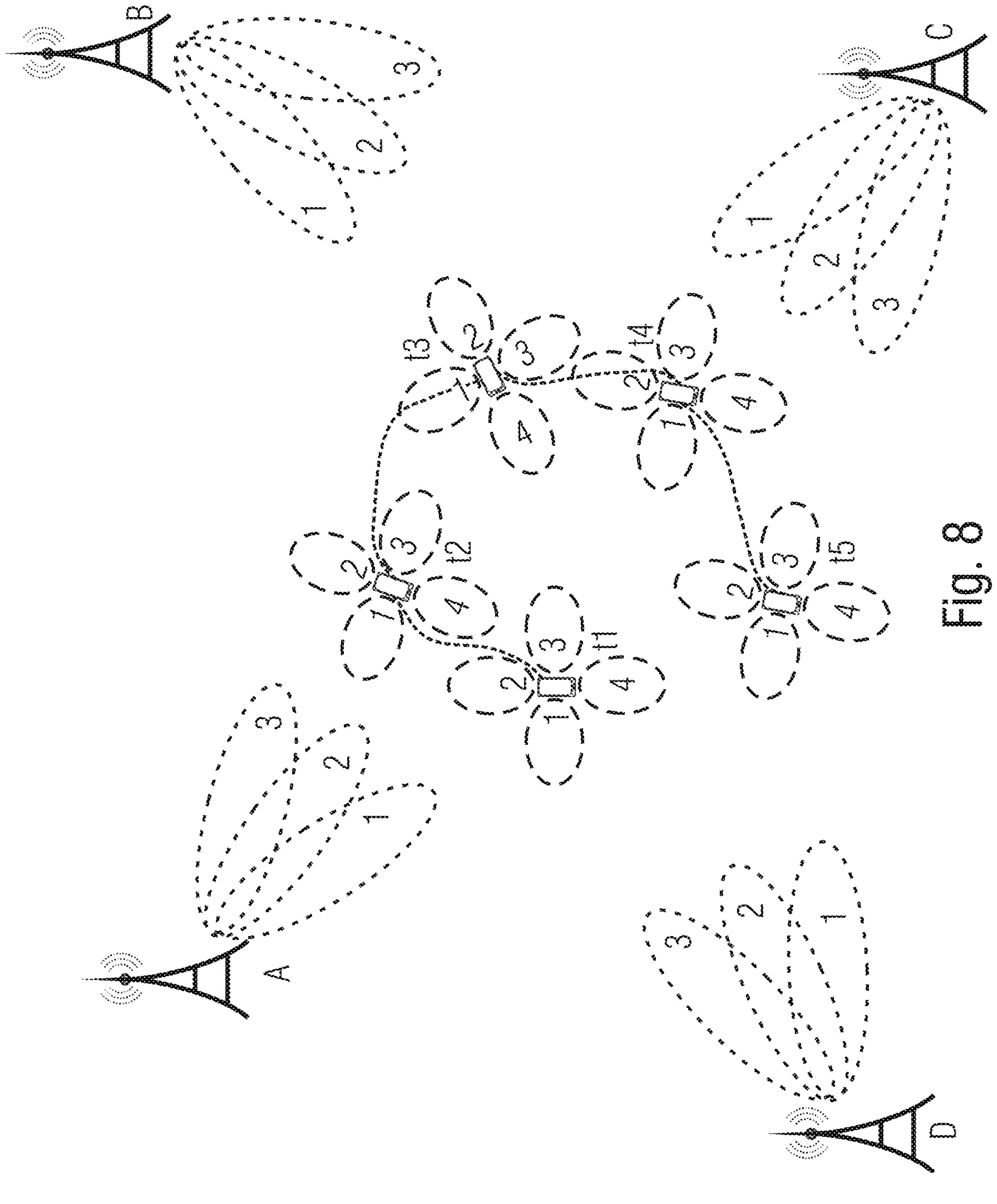
FIG. 8 illustrates changing DL-RS information within an area.

FIG. 8 illustrates changing DL-RS information within an area.

In the example illustrated by FIG. 8, a UE performs DL-RS Measurements on a trajectory where the spatial DL-RS resources between two timely spaced measurements changes. The UE receives the group assistance and information on the DL-RS subsets within the group of DL-RS resources. The UE receives the DL-AD group and subset information at a time prior to the first measurement at time t1; the UE identifies a first valid subset of DL-RS valid on the measurements performed at time t1 and identifies at a later measurement time instants that the DL-RS at time t1 is no longer valid. In one option, the UE identifies s new valid DL-AD subset from the provided information and applies the subset information on the measurement. In another option, the UE identify that the DL-AD is not valid informs the NW entity or requests new AD information from the NW entity.

For a UE [in assisted mode] moving along a track, the UE reports measured DL-RSs on multiple time instances to the LMF. The LMF uses this information to indicate information to the UE on DL-RSs in the predicted next area.

Regarding AD update, in one aspect, the UE may receive DL-RSs properties which includes one or more indications on the association of one or more DL-RS(s) within a group of DL-RS(s).

The information may also include an indication of one or more geographical area(s), within which the given subset of DL-RSs are expected to be measured in the form of area-specific index. The LMF indication can be in the form of resources, resource sets and frequency layers (among multiple TRPs). The UE reports its measurement to the LMF to be used as a quality indicator of the subset in the same area index.

Regarding Broadcast/Unicast, in an example, a BS may transmit one or more DL-RS(s) to a target UE. The BS may also transmits one or more DL-RS(s) to support coverage for a given area where one or more UEs can receive the signal.

In an example the configuration message is not UE specific and applicable for multiple UEs in a positioning area, wherein the configuration message is user specific. In one option, the UE receives the configuration message on a first interface such as broadcast interface and in over a unicast interface.

Regarding capability, the UE may, e.g., provide the network with one or more information on the maximum number of DL-RSs a UE can process, the capability can indicate one or more of the following:

Max number of frequency layers

Max number of DL RS resource sets per BS per frequency layer

Max number of Resources per DL RS resource set

Max number of DL PRS resources per UE

Max number of BS for all frequency layers

Max number of Resources per frequency layer

The UE may receive an instruction from the NW to cause the UE provide information on its capabilities on processing or reporting measurements on DL-RS(s). The UE provides the network of it capability to process a maximum of N resources. The UE receives M in assistance information message (M>=N) resources. The UE applies the information in the message to select the up to N resources from the one or more subsets.

A DL-AOD beam selection example according to an embodiment is now provided, which comprises one or more or all of the following steps:

1. In DL-AoD UE assisted mode, and based on a previous message, the UE measures and reports information to the network on the measurement quality of DL-RS resources. This information may include RSRP, RSTD, TOA or beam characteristics.
2. Based on this report, the network (e.g. LMF) provides the UE with at least a single assistance data message including a refined group of DL-RS resources associated with the previously measured DL-RSs by the UE, which corresponds to the best-measured quality. These qualities can be one or more of the following RSRP, RSTD, TOA or alternatively AoD estimate.
3. UE receives from the network entity or a second entity at least one configuration message on one or more DL-RSs of the refined group of DL-RSs, and
4. UE receives from the BS(s) one or more DL-RS(s).
5. Based on the information in, a refined set of the previously measured DL-RSs [as in 2.] is determined to perform measurement on.
6. The UE performs measurements based on the information.
7. The UE reports one or more measurements to the network based on the information in.

In the following, direct spatial and position information according to some embodiments are described.

In particular, embodiments for directional information, more particularly, a TRP TX beam direction example in LCS/GCS, are described.

In one aspect, the UE may receive information on the transmission characteristics. The transmission characteristics associated with one or more ID(s) for one or more DL-RS resources, or resource sets. The transmission characteristics includes information on the DL-RS transmit direction from a single BS, wherein the direction information may include the beam AoD or ZoD boresight and optionally one or more sidelobe information for each indicated DL-RS(s) in.

In one aspect, the UE) may receive information on the transmission characteristics. The transmission characteristics associated with one or more DL-RS transmitted from multiple TRPs. The transmission characteristics includes information on the DL-RS transmit direction from a group of multiple TRP(s), wherein the direction information may include the beam boresight and optionally one or more sidelobe information for each indicated DL-RS(s) in. Additionally or alternatively, the UE may receive one or more TRP-ID(s) or one or more positioning frequency layer ID Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 9:
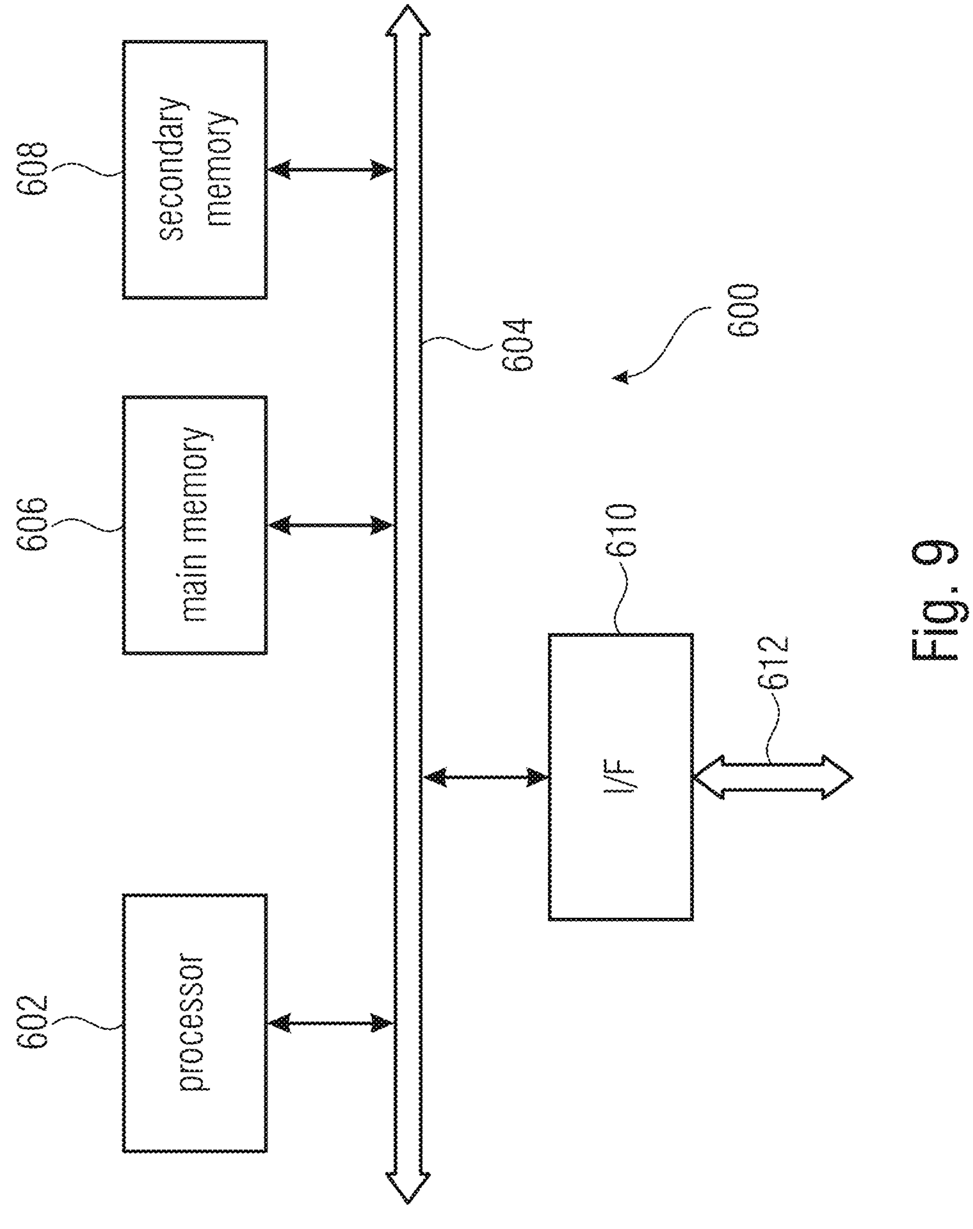
FIG. 9 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 9 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

RRC TS38.331 v16.1.0
LPP TS37.355 v16.1.0
NRPPa TS38.455 v16.0.0

Abbreviations

| Abbreviation | Definition |
|---|---|
| 3GPP | third generation partnership project |
| 5GC | 5G core network |
| BS | base station |
| CSI-RS | channel state information reference signal |
| DMRS | demodulation reference signal |
| DOA | direction of arrival |
| E-CID | enhanced cell ID |
| eNB | evolved node b |
| E-SMLC | evolved serving mobile location center. |
| E-UTRA | evolved UMTS terrestrial radio access |
| gNB | next generation node-b |
| GPS | Global Positioning System |
| LMF | location management function |
| LMU | location measurement unit |
| LPP | LTE positioning protocol |
| LTE | Long-term evolution |
| NG | next generation |
| ng-eNB | next generation eNB |
| NG-RAN | either a gNB or an ng-eNB |
| NR | new radio |
| NRPPa | new radio positioning protocol a |
| OTDOA | observe time difference of arrival |
| PRS | position reference signal |
| PTRS | phase tracking reference signal |
| QCL | quasi colocation |
| RAN | radio access network |
| RP | reception point |
| RSTD | reference signal time difference |
| RTOA | relative time of arrival |
| RTT | round trip time |
| SA | Standalone |
| SRS | sounding reference signal |
| TDM | Time Domain Multiplexing |
| TOF | time of flight |
| TRP | transmission reception point |
| RS | reference signal |
| QCL | quasi co-located |
| AoA | Angle of Arrival |
| AoD | Angle of Departure |
| PAS | Power Angular Spectrum |
| NR | New Radio |

The invention claimed is:

1. A user equipment for transmitting and receiving data in a wireless communication system, wherein the user equipment is configured to receive, from a first network entity of the wireless communication system, assistance data comprising information on a plurality of downlink resources of the wireless communication system, wherein each of the plurality of downlink resources is associated with one of a plurality of beams;

wherein the user equipment is configured to receive configuration information from the first network entity or from a second network entity of the wireless communication system;

characterized in that the configuration information comprises information on one or more proper subsets of the plurality of downlink resources, wherein a proper subset of the one or more proper subsets comprises at least one of the plurality of downlink resources, which are associated with one or more first beams of the plurality of beams, and does not comprise one or more other downlink resources of the plurality of downlink resources, which are associated with one or more second beams of the plurality of beams;

wherein the user equipment is configured to perform and/or to report one or more measurements depending on the configuration information, wherein the user equipment is configured to perform and/or to report the one or more measurements only for the proper subset of downlink resources.

2. The user equipment according to claim 1, wherein the plurality of resources comprise a plurality of downlink resources of the wireless communication system, wherein the assistance data comprises information on the plurality of downlink resources of the wireless communication system, wherein the one or more proper subsets comprise at least one of the plurality of downlink resources.

3. The user equipment according to claim 2, wherein the plurality of downlink resources comprise a plurality of downlink reference signal resources of the wireless communication system; wherein the assistance data comprises information on the plurality of downlink reference signal resources of the wireless communication system; wherein the one or more proper subsets comprise at least one of the plurality of downlink reference signal resources.

4. The user equipment according to claim 2, wherein the plurality of downlink resources comprises at least one of:

a plurality of physical downlink control channel resources of the wireless communication system, wherein the assistance data comprises information on the plurality of physical downlink control channel resources of the wireless communication system, wherein the one or more proper subsets comprise at least one of the plurality of physical downlink control channel resources;

a plurality of physical downlink shared channel resources of the wireless communication system, wherein the assistance data comprises information on the plurality of physical downlink shared channel resources of the wireless communication system, wherein the one or more proper subsets comprise at least one of the plurality of physical downlink shared channel resources;

a plurality of physical broadcast channel resources of the wireless communication system, wherein the assistance data comprises information on the plurality of physical broadcast channel resources of the wireless communication system, wherein the one or more proper subsets comprise at least one of the plurality of physical broadcast channel resources.

5. The user equipment according to claim 1, wherein the user equipment is configured to perform or to report or to perform and report at least one of:

the one or more measurements on all resources of the plurality of resources that are comprised by the one or more first subsets;

the one or more measurements on all resources of the plurality of resources that are not comprised by the one or more second subsets;

the one or more measurements on one or more but not all of the plurality of resources that are comprised by the one or more first subsets;

the one or more measurements on one or more but not all of the plurality of resources that are not comprised by the one or more second subsets;

the one or more measurements to determine at least one of power delay profile information and one or more channel impulse response reports and one or more phase measurements on a first arrival path.

6. The user equipment according to claim 1, wherein the configuration information comprises information on one or more proper subsets of the plurality of resources for the purpose of prioritization.

7. The user equipment according to claim 1, wherein the user equipment is configured to determine a positioning method depending on a resource of the at least one proper subset to perform or to report or to perform and report the one or more measurements on the one or more of the plurality of resources.

8. The user equipment according to claim 1, wherein the assistance data comprises information that is hierarchically organized in two or more layers, wherein each of the two or more layers comprises one or more information nodes, wherein for at least one of the two or more layers, each of the one or more information nodes of said layer provides information on one of the plurality of resources.

9. The user equipment according to claim 1, wherein the user equipment is configured to determine the one or more proper subsets depending on a criterion, and wherein the criterion is indicated by the configuration information, or is selected depending on the one or more measurements, or is indicated by the configuration information and selected depending on the one or more measurements.

10. The user equipment according to claim 9, wherein the criterion defines that the user equipment shall select the one or more proper subsets depending on at least one of one or more reference signal receive power measurements and one or more time of arrival measurements and/or one or more signal qualities of one or more of the plurality of resources, and wherein the user equipment is configured to determine the one or more proper subsets depending on at least one of the one or more reference signal receive power measurements, and the one or more time of arrival measurements, and the one or more signal qualities of the one or more of the plurality of resources.

11. The user equipment according to claim 1, wherein the one or more measurements comprise at least one of a measurement of a reference signal receive power for a downlink angle of departure, and a measurement of a reference signal time difference for a downlink time difference of arrival, and a user equipment receive-transmit round trip time.

12. The user equipment according to claim 1, wherein, after receiving the configuration information, the user equipment is configured to not perform any measurement for any one of the one or more second beams.

13. The user equipment according to claim 1, wherein the configuration information depends on a beam direction and an expected coverage of one or more of the plurality of beams.

14. The user equipment according to claim 1, wherein the configuration information depends whether or not a line-of-sight condition is valid for one or more of the plurality of beams.

15. The user equipment according to claim 1, wherein the user equipment is configured to perform or to report or to perform and report the one or more measurements on the one or more of the plurality of resources for determining a position of the user equipment without taking the first line-of-sight information into account, or without taking the maximum reference signal received power information into account, or without taking the first line-of-sight information and the maximum reference signal received power information into account, wherein the user equipment is configured to perform or to report or to perform and report the one or more measurements on the one or more of the plurality of resources for transmitting the information on the one or more measurements to the first network entity or to the second network entity to enable the first network entity or the second network entity to determine the position of the user equipment without taking the first line-of-sight information into account, or without taking the maximum reference signal received power information into account, or without taking the first line-of-sight information and the maximum reference signal received power information into account.

16. The user equipment according to claim 1, wherein the configuration information indicates, for at least one of the plurality of resources, association data, wherein the association data comprises for the one or more proper subsets an indication of one or more geographical areas, within which the one or more proper subsets are expected to be measured.

17. A system comprising:

a user equipment according to claim 1, and a network entity for transmitting and receiving data in a wireless communication system, wherein a user equipment is configured to receive, from the network entity or from another network entity, assistance data comprising information on a plurality of resources of the wireless communication system;

wherein the network entity is configured to transmit configuration information to the user equipment; wherein the configuration information comprises information on one or more proper subsets of the plurality of resources, wherein each of the one or more proper subsets comprises at least one of the plurality of resources.

18. A method for transmitting and receiving data in a wireless communication system, wherein the method comprises:

receiving, by a user equipment, from a first network entity of the wireless communication system, assistance data comprising information on a plurality of downlink resources of the wireless communication system;

receiving, by the user equipment, configuration information from the first network entity or from a second network entity of the wireless communication system;

characterized in that the configuration information comprises information on one or more proper subsets of the plurality of downlink resources, wherein a proper subset of the one or more proper subsets comprises at least one of the plurality of downlink resources, which are associated with one or more first beams of the plurality of beams, and does not comprise one or more other downlink resources of the plurality of downlink resources, which are associated with one or more second beams of the plurality of beams;

wherein the user equipment performs and/or reports one or more measurements depending on the configuration information, wherein the user equipment performs and/or reports the one or more measurements only for the proper subset of downlink resources.

19. A method according to claim 18, wherein, after receiving the configuration information, the method comprises not performing any measurement on any of the plurality of resources that are not comprised by the one or more first subsets, and comprises performing the one or more measurements on one or more of the plurality of resources that are comprised by the one or more first subsets; or wherein the one or more proper subsets comprise one or more second subsets of the plurality of resources; wherein, after receiving the configuration information, the method comprises not performing any measurement on any of the plurality of resources that are comprised by the one or more second subsets; and comprises performing the one or more measurements on one or more of the plurality of resources that are not comprised by the one or more second subsets.

* * * * *